US010133932B2

United States Patent
Sato et al.

(10) Patent No.: US 10,133,932 B2
(45) Date of Patent: Nov. 20, 2018

(54) IMAGE PROCESSING APPARATUS, COMMUNICATION SYSTEM, COMMUNICATION METHOD AND IMAGING DEVICE

(71) Applicant: OLYMPUS CORPORATION, Hachioji-shi, Tokyo (JP)

(72) Inventors: Akinobu Sato, Hachioji (JP); Takashi Suzuki, Hino (JP); Yoichi Yoshida, Inagi (JP); Osamu Nonaka, Sagamihara (JP)

(73) Assignee: OLYMPUS CORPORATION, Tokyo (JP)

( * ) Notice: Subject to any disclaimer, the term of this patent is extended or adjusted under 35 U.S.C. 154(b) by 76 days.

(21) Appl. No.: 15/293,820

(22) Filed: Oct. 14, 2016

(65) Prior Publication Data

US 2017/0032190 A1 Feb. 2, 2017

Related U.S. Application Data

(63) Continuation of application No. PCT/JP2015/060984, filed on Apr. 8, 2015.

(30) Foreign Application Priority Data

Apr. 15, 2014 (JP) .................... 2014-083861
May 1, 2014 (JP) .................... 2014-094827

(51) Int. Cl.
  *G06K 9/00* (2006.01)
  *G06F 17/30* (2006.01)
  *H04N 5/232* (2006.01)

(52) U.S. Cl.
  CPC ......... *G06K 9/00718* (2013.01); *G06F 17/30* (2013.01); *G06F 17/30256* (2013.01);
  (Continued)

(58) Field of Classification Search
  CPC ..................... H04N 5/23206; H04N 5/23219
  See application file for complete search history.

(56) References Cited

U.S. PATENT DOCUMENTS

2015/0036003 A1* 2/2015 Sakurai ............... H04N 5/772
  348/207.11

FOREIGN PATENT DOCUMENTS

| JP | 6-083264 A | 3/1994 |
| JP | 11-252427 | 9/1999 |

(Continued)

OTHER PUBLICATIONS

English Translation of International Preliminary Report on Patentability issued in corresponding International Patent Application No. PCT/JP2015/060984 dated Oct. 18, 2016, consisting of 14 pp.

(Continued)

*Primary Examiner* — James Hannett
(74) *Attorney, Agent, or Firm* — Volpe and Koenig, P.C.

(57) ABSTRACT

An image processing apparatus includes an image acquisition unit, an image recognition unit, a character information acquisition unit, and a communication unit. The image acquisition unit acquires an image. The image recognition unit recognizes image characteristic information acquired by the image acquisition unit. The character information acquisition unit acquires character information from the characteristic information recognized by the image recognition unit. The communication unit communicates the character information acquired by the character information acquisition unit to a guide information retrieval device that retrieves guide information from the character information.

14 Claims, 17 Drawing Sheets

(52) U.S. Cl.
CPC ... *G06F 17/30268* (2013.01); *G06K 9/00335* (2013.01); *G06K 9/00671* (2013.01); *G06K 9/00744* (2013.01); *H04N 5/23206* (2013.01); *H04N 5/23219* (2013.01); *H04N 5/23222* (2013.01); *H04N 5/23293* (2013.01)

(56) References Cited

FOREIGN PATENT DOCUMENTS

| | | |
|---|---|---|
| JP | 2001066684 A | 3/2001 |
| JP | 2001-197340 A | 7/2001 |
| JP | 2002176509 A | 6/2002 |
| JP | 2002-222200 A | 8/2002 |
| JP | 2008-152569 A | 7/2008 |
| JP | 2008-288881 A | 11/2008 |
| JP | 2009-060337 A | 3/2009 |
| JP | 2012-043414 A | 3/2012 |
| JP | 2012-248013 A | 12/2012 |
| JP | 2013-058089 A | 3/2013 |
| JP | 2013-128251 A | 6/2013 |
| WO | 2013089042 A1 | 6/2013 |
| WO | 2013115203 A1 | 8/2013 |

OTHER PUBLICATIONS

International Search Report issued in corresponding International Patent Application No. PCT/JP2015/060984 dated Jul. 14, 2015, consisting of 11 pp. (English Translation Provided).

Adachi, Hisahiro, "A Retrieval System for Japanese Signs Using Manual Motion Sequences", IPSG SIG Notes, Mar. 12, 1998, vol. 98, No. 21 (98-NL-124), pp. 79-85. (English Translation of Abstract Provided).

Kuwako, Hiroaki et al., "The JSL Electronic Dictionary on the WWW", Human Interface Society Kenkyu Hokokushu, Dec. 15, 2000, vol. 2, No. 5, pp. 11-14. (English Translation of Abstract Provided).

Office Action issued in corresponding Japanese Patent Application No. 2014-094827 dated Feb. 13, 2018, consisting of 11 pp. (English Translation Provided).

\* cited by examiner

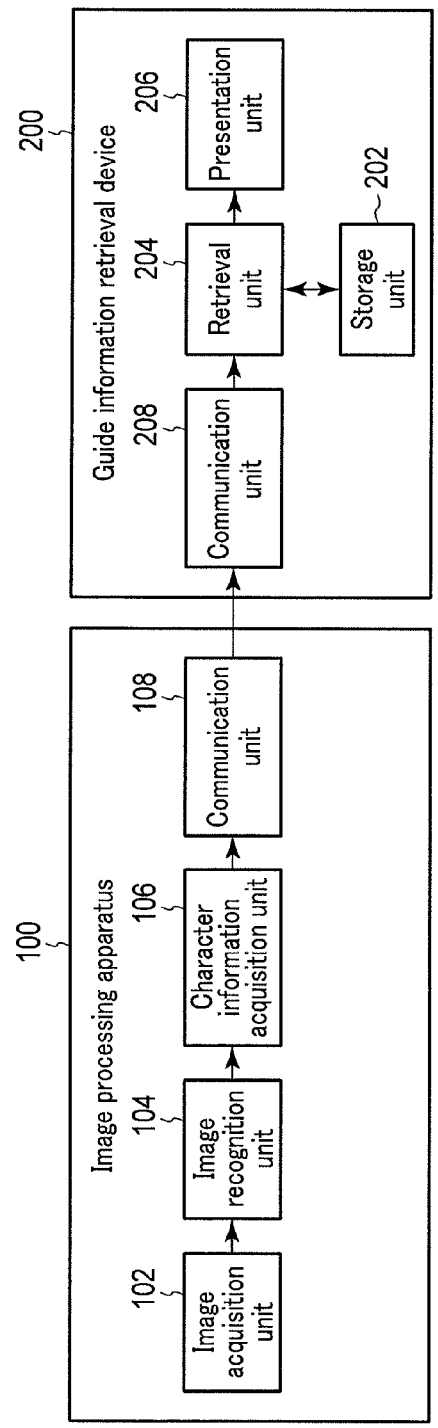
F I G. 1

F I G. 6A
F I G. 6B
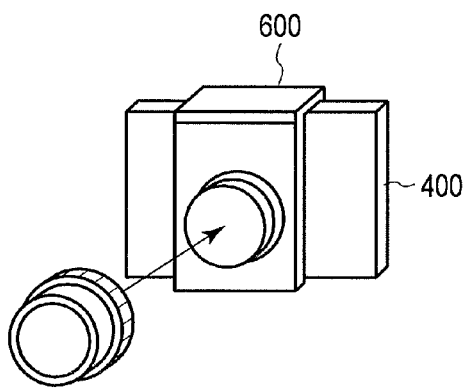
F I G. 6C

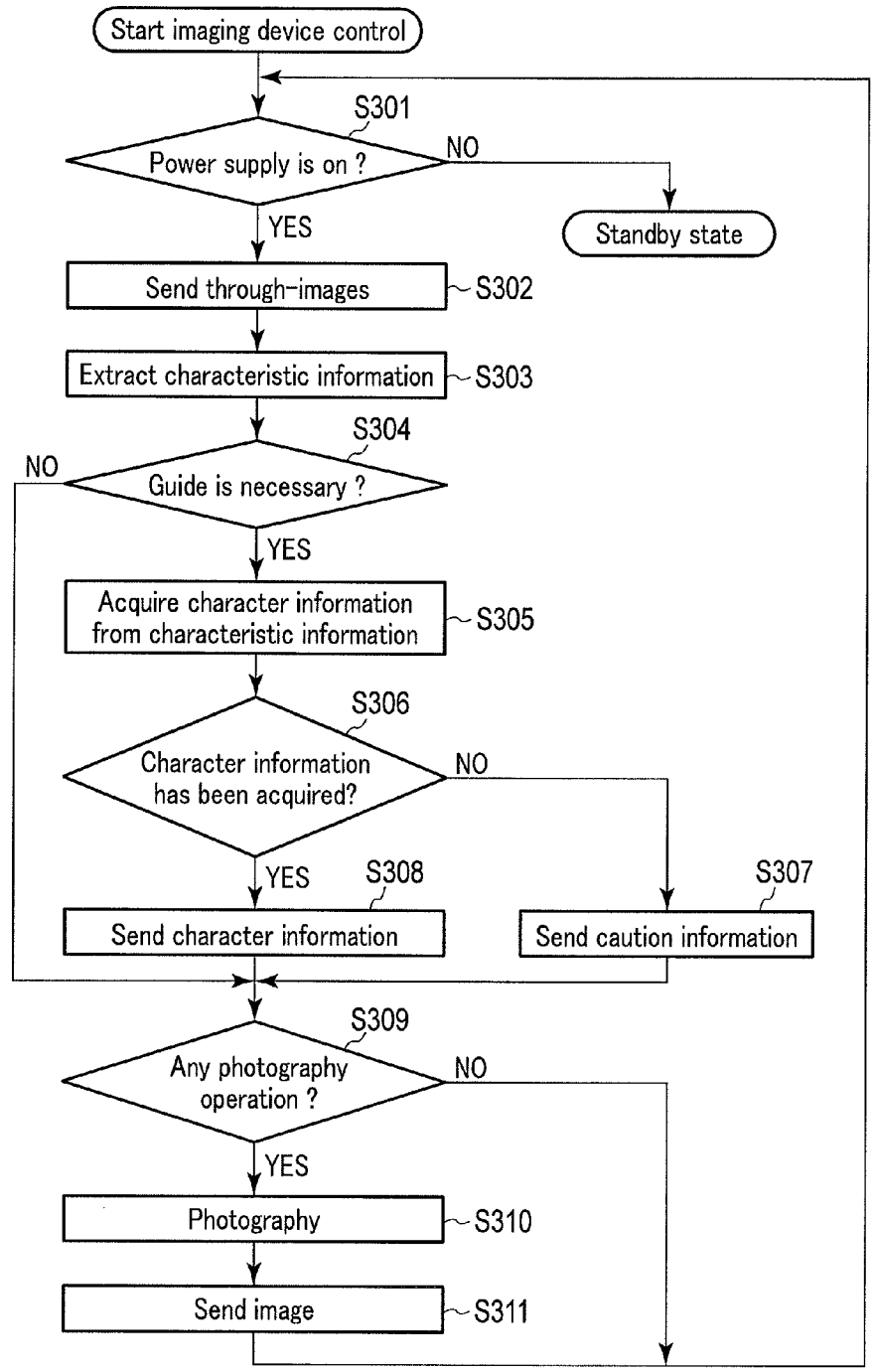
F I G. 7

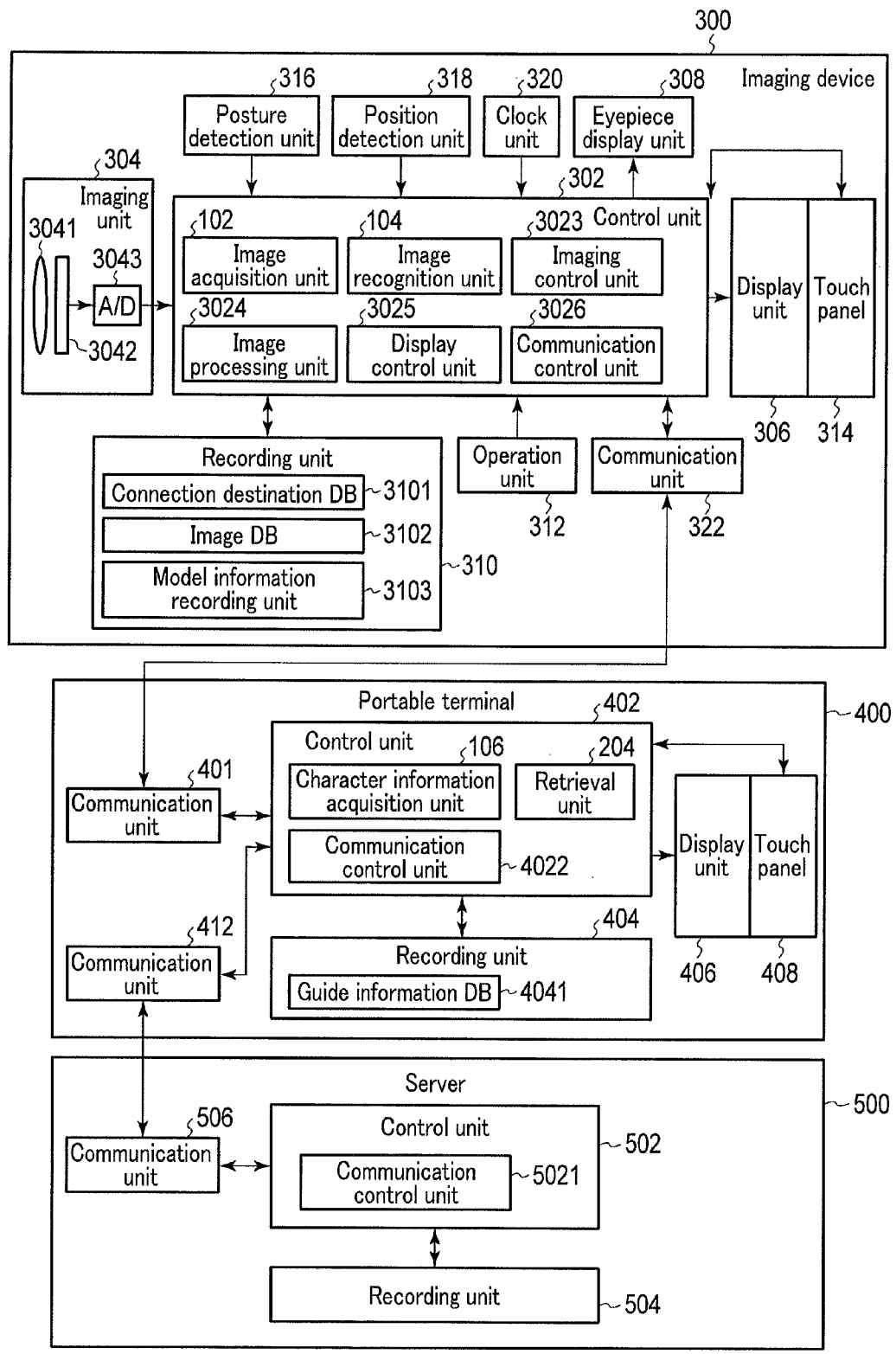
F I G. 10

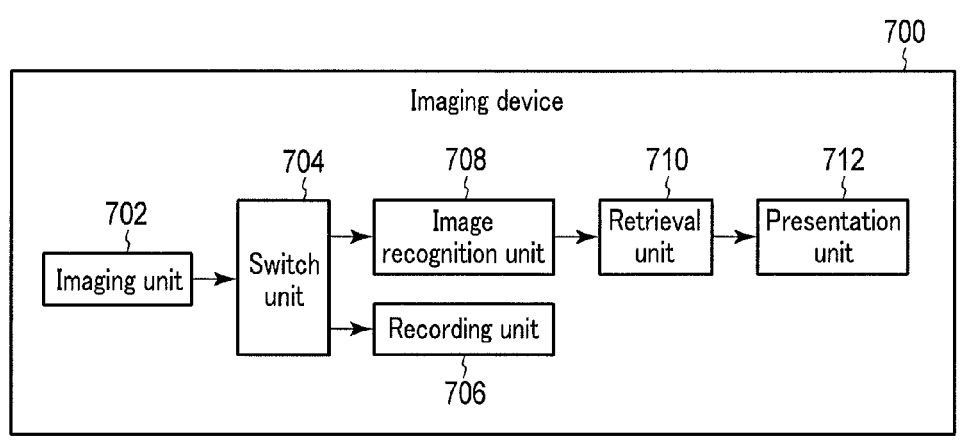
F I G. 11

IMAGE PROCESSING APPARATUS, COMMUNICATION SYSTEM, COMMUNICATION METHOD AND IMAGING DEVICE

CROSS-REFERENCE TO RELATED APPLICATIONS

This application is a Continuation application of PCT Application No. PCT/JP2015/060984, filed Apr. 8, 2015 and based upon and claiming the benefit of priority from the prior Japanese Patent Application No. 2014-083861, filed Apr. 15, 2014, and No. 2014-094827, filed May 1, 2014, and the entire contents, the entire contents of all of which are incorporated herein by reference.

BACKGROUND OF THE INVENTION

1. Field of the Invention

The present invention relates to an image processing apparatus, a communication system, a communication method and an imaging device.

2. Description of the Related Art

Recently, devices such as mobile telephones and digital cameras having an image recognition function have been suggested. For example, Jpn. Pat. Appln. KOKAI Publication No. 2002-176509 has suggested a portable information reading apparatus capable of reading a bar code from an image obtained by imaging. Jpn. Pat. Appln. KOKAI Publication No. 2008-152569 has suggested a code reading apparatus capable of reading two-dimensional codes.

Recently, imaging devices having a guide function to guide, for example, an imaging operation by a user have been suggested. For example, an imaging device suggested in Jpn. Pat. Appln. KOKAI Publication No. 2001-66684 have functions of operation buttons of the imaging device prestored in a storage unit so that the function of each operation button is presented to the user as guide information when a help button is operated by the user.

BRIEF SUMMARY OF THE INVENTION

According to a first aspect of the invention, there is provided an image processing apparatus comprising: an image acquisition unit which acquires an image; an image recognition unit which recognizes image characteristic information acquired by the image acquisition unit; a character information acquisition unit which acquires character information from the characteristic information recognized by the image recognition unit; and a communication unit which communicates the character information acquired by the character information acquisition unit to a guide information retrieval device that retrieves guide information from the character information.

According to a second aspect of the invention, there is provided an image processing apparatus comprising: an image acquisition unit which acquires an image; an image recognition unit which recognizes characteristic information that permits character information to be acquired from an image acquired by the image acquisition unit; and a communication unit which communicates the characteristic information recognized by the image recognition unit to the guide information retrieval device that acquires character information from the characteristic information to retrieve guide information.

According to a third aspect of the invention, there is provided a communication system comprising: an image processing apparatus comprising an image acquisition unit which acquires an image, an image recognition unit which recognizes characteristic information that permits character information to be acquired from the image acquired by the image acquisition unit, a character information acquisition unit which acquires character information from the characteristic information recognized by the image recognition unit, and an image processing apparatus side communication unit which sends the character information acquired by the character information acquisition unit; and a guide information retrieval device comprising a guide information retrieval device side communication unit which receives the character information communicated from the image processing apparatus side communication unit, a retrieval unit which retrieves guide information from the received character information, and a presentation unit which presents the retrieved guide information to a user.

According to a fourth aspect of the invention, there is provided a communication system comprising: an image processing apparatus comprising an image acquisition unit which acquires an image; an image recognition unit which recognizes characteristic information that permits character information to be acquired from the image acquired by the image acquisition unit, and an image processing apparatus side communication unit which sends the characteristic information acquired by the image recognition unit; and a guide information retrieval device comprising a guide information retrieval device side communication unit which receives the character information communicated from the image processing apparatus side communication unit, a character information acquisition unit which acquires character information from the received characteristic information, a retrieval unit which retrieves guide information from the acquired character information, and a presentation unit which presents the retrieved guide information to a user.

According to a fifth aspect of the invention, there is provided a communication method comprising: acquiring an image; recognizing characteristic information that permits character information to be acquired from the acquired image; acquiring character information from the recognized characteristic information; communicating the acquired character information to a guide information retrieval device that retrieves guide information from the character information; retrieving guide information from the communicated character information in the guide information retrieval device; and presenting the guide information retrieved in the guide information retrieval device to a user.

According to a sixth aspect of the invention, there is provided a communication method comprising: acquiring an image; recognizing characteristic information that permits character information to be acquired from the acquired image; communicating the recognized characteristic information to a guide information retrieval device that acquires character information from the characteristic information to retrieve guide information; acquiring character information from the communicated character information; retrieving guide information from the acquired character information in the guide information retrieval device; and presenting the guide information retrieved in the guide information retrieval device to a user.

According to a seventh aspect of the invention, there is provided an imaging device comprising: an imaging unit which images a target to acquire an image of the target; a switch unit which switches between a photography mode to use the image acquired by the imaging unit for recording and a guide information retrieval mode to use the image acquired by the imaging unit for the retrieval of guide information; a recording unit which records the image acquired by the imaging unit in the photography mode; an image recognition unit which recognizes characteristic information from the image acquired by the imaging unit in the guide information retrieval mode; and a retrieval unit which retrieves the guide information from the recognized characteristic information.

Advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWINGS

The accompanying drawings, which are incorporated in and constitute a part of the specification, illustrate embodiments of the invention, and together with the general description given above and the detailed description of the embodiments given below, serve to explain the principles of the invention.

FIG. 1 is a functional block diagram of a communication system including an image processing apparatus according to a first embodiment of the present invention;

FIG. 6A is a diagram showing the exterior of an imaging device according to Modification 2 of the first embodiment;

FIG. 6B is a diagram showing the exterior of a portable terminal according to Modification 2 of the first embodiment;

FIG. 6C is a diagram showing a portable terminal to which an imaging device is attached via an attachment;

FIG. 7 is a flowchart showing the control of the imaging device according to Modification 2 of the first embodiment;

FIG. 10 is a diagram showing the configuration of the communication system which is an application example of the image processing apparatus and the guide information retrieval device according to the second embodiment;

FIG. 11 is a functional block diagram of an imaging device according to a third embodiment of the present invention;

DETAILED DESCRIPTION OF THE INVENTION

Figure 2:
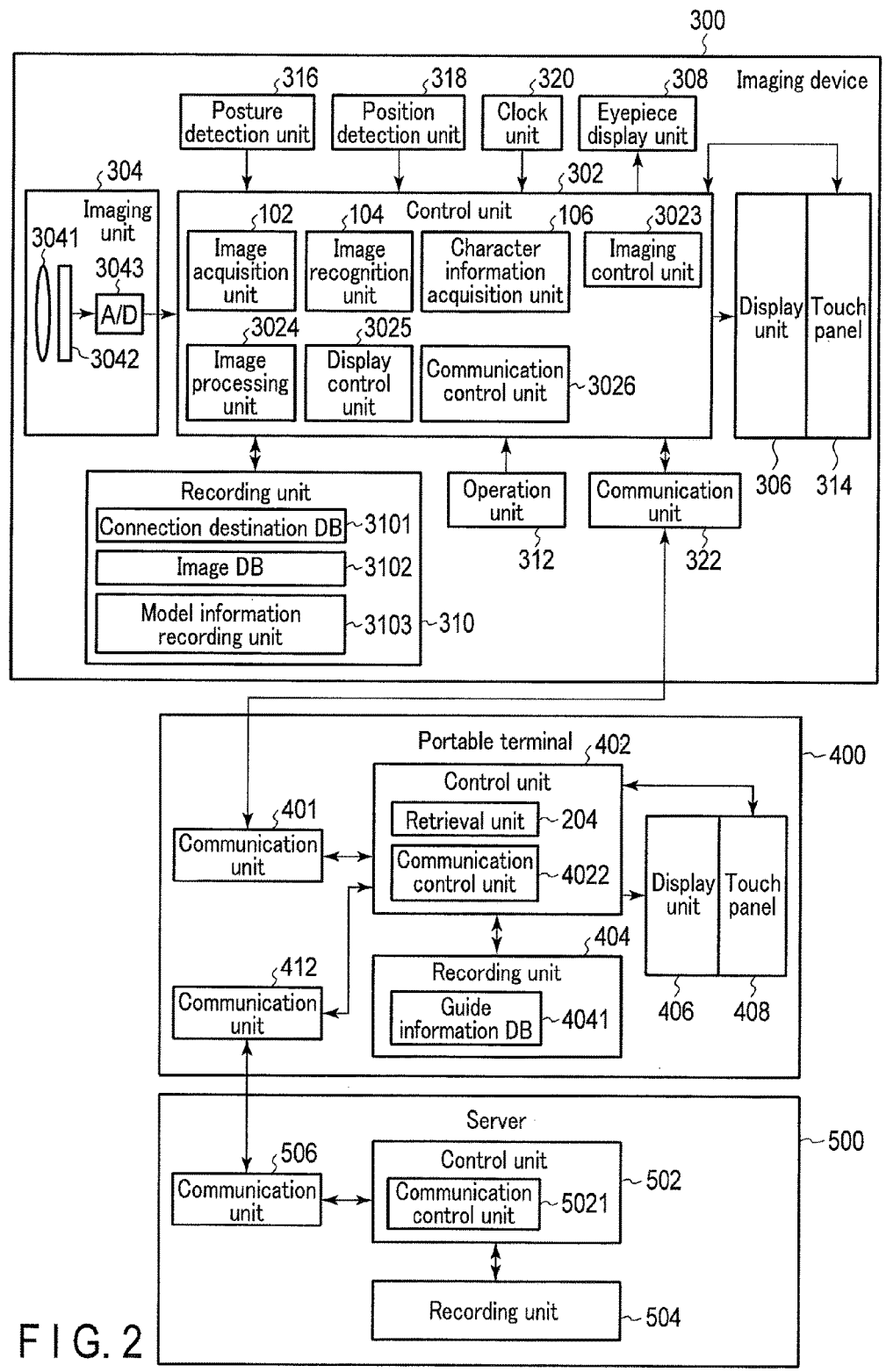
FIG. 2 is a diagram showing the configuration of the communication system which is an application example of the image processing apparatus and a guide information retrieval device according to the first embodiment.

Hereinafter, embodiments of the present invention will be described with reference to the drawings.

First Embodiment

Initially, the first embodiment of the present invention is described. FIG. 1 is a functional block diagram of a communication system including an image processing apparatus according to a first embodiment of the present invention. An image processing apparatus 100 includes an image acquisition unit 102, an image recognition unit 104, a character information acquisition unit 106, and a communication unit 108. This image processing apparatus 100 is configured to communicate with a guide information retrieval device 200.

The image acquisition unit 102 acquires images. This image acquisition unit 102 acquires, for example, an image obtained by imaging using an imaging unit. Otherwise, the image acquisition unit 102 may be configured to acquire images input from an external equipment of the image processing apparatus 100.

The image recognition unit 104 recognizes the image input by the image acquisition unit 102. The "recognition" here is processing to obtain characteristic information such that character information can be acquired in the character information acquisition unit 106. For example, this recognition includes processing to recognize the shape, color, and motion of a target in the image, and processing to recognize characters in the image. For example, face recognition techniques have been developed in recent years, and pet detection which applies such techniques is also known. Moreover, there may be human body parts detection for use in gesture recognition, and it is possible to adapt to more scenes if there are, for example, recognition of parts shapes and overall shapes of plants and animals to be subjects, and recognition of the shapes of clothes and accessories. Information regarding the distance to a target and size information may be used. This allows identification of even the kinds of insects having similar shapes to be more precise. Whether the motion is fast or slow may be important information that permits characteristics of a target to be judged. For example, birds may be identified by how they flap (e.g. a flapping period). Shapes specific to flapping, an angle of elevation during photography, and the positional relation between the ground and the surface of the water may be converted into words of actions such as "fly", "run" and "swim". This recognition includes processing to recognize information that can be converted into numerical values, such as the distance to the target at the time of the acquisition of an image, the position where the image has been acquired, and the time when the image has been acquired. The character information acquisition unit 106 acquires character information by use of the result of the recognition in the image recognition unit 104 and a later-described image database (image dictionary) 310. For example, candidate words can be retrieved from the color, characteristics, and size obtained from the image of the target in the image recognition unit 104, and relevant information during photography. For example, characteristics of the shape of petals are detected. If the their color is pink, a "cherry blossom" may not be recognized, but the image dictionary is searched in accordance with the characteristics of the image, and text information such as "pink" and "blossom" are retrieved. Alternatively, it is also possible to use date information in a clock unit 320 for conversion into words such as "April" or "spring", or use information regarding the size and distance of the target in a screen for conversion into text information such as "the size of one blossom is 2.5 cm". If such recognition is conducted, the character information acquisition unit 106 can acquire character information such as the name of the target from the result of target recognition. The target may be a sign, a poster, a book, a magazine, a CD, or an LP, so that optical character recognition (OCR) technique (which finds a match from an image of a type document by comparing with a template including necessary identification patterns) may be literally used together. If the whole image is sent with the assumption of an image detection technique at the destination of sending, and particularly if even moving images to judge the aforementioned motion are sent, the load of communication increases. Therefore, here, retrieval performance is improved on the basis of text retrieval for which various techniques have been developed on the Internet and the like and many techniques have been established so that various retrieval results can be enjoyed. Moreover, an image is summarized by characters so that the user recognition may be easier and the amount of data to be sent is reduced. Consequently, guide information can be rapidly, easily, and conveniently obtained. The face recognition and OCR techniques have been chipped, reduced in size, and increased in speed. When such parts are detected during photography, it becomes possible to make a summary that judges a pose, a motion pattern, and even the change of characters from the motion of the face and the relation between the face and human body parts. The "image characteristic information" includes, for example, an identification pattern of the image, a signal indicating objects that have been detected accordingly, the number and sizes of the objects, and the colors and motions of the detected objects. Characteristic change information to retrieve expression, pose, or motion, or what can be paraphrased as the change of the characteristic information may also be included. A correct way of motion of the target can be judged from the motion of the device and the motion of the image, so that, for example, the swaying period of a swaying blossom can only be correctly judged by the present method.

The communication unit 108 communicates with the guide information retrieval device 200. For example, the communication unit 108 sends the character information acquired in the character information acquisition unit 106 to the guide information retrieval device 200. The communication unit 108 receives the information retrieved in the guide information retrieval device 200. This character information may be a conversion of the recognition of the image into words of a human language and may be a color or a shape, or may be a sequence of words which summarizes in such a form as "rapidly flying insect" including motion or a list of words such as "rapid", "fly", and "insect". As described above, the word "rapid" can only be correctly judged by the difference between the motion of the image and the motion of the device. Such motion can be judged if the temporal change of the image (characteristics) is associated with words in a later-described "moving image database". The motion judgment in this instance is preferably the temporal change of the image which has been corrected or considered by subtracting or canceling the motion of the device or equipment. The image here may be paraphrased as the temporal change of the characteristic information in the target image.

The guide information retrieval device 200 includes a storage unit 202, a retrieval unit 204, a presentation unit 206, and a communication unit 208.

The storage unit 202 stores character information and various information in association with each other. The various information to be associated with the character information is, for example, guide information to guide the user on a photography method to photograph a target.

The retrieval unit 204 retrieves information corresponding to the character information received in the communication unit 208 from the storage unit 202. The retrieval unit 204 may be configured to also acquire information from the outside of the storage unit 202. For example, the retrieval unit 204 may use the character information received in the communication unit 208 as retrieval keywords to acquire information by retrieval in, for example, a search site.

The presentation unit 206 presents the information received in the retrieval unit 204 to the user. This presentation is conducted by, for example, display.

The communication unit 208 communicates with the image processing apparatus 100. For example, the communication unit 208 receives the character information sent from the image processing apparatus 100. The communication unit 208 also sends the information retrieved in the retrieval unit 204 to the image processing apparatus 100 as necessary.

FIG. 2 is a diagram showing the configuration of the communication system which is an application example of the image processing apparatus 100 and the guide information retrieval device 200 shown in FIG. 1. The communication system shown in FIG. 2 includes an imaging device 300, a portable terminal 400, and a server 500. The imaging device 300 and the portable terminal 400 are configured to communicate with each other. The portable terminal 400 and the server 500 are configured to communicate with each other.

The imaging device 300 has a function as the image processing apparatus 100, and includes a control unit 302, an imaging unit 304, a display unit 306, an eyepiece display unit 308, the recording unit 310, an operation unit 312, a touch panel 314, a posture detection unit 316, a position detection unit 318, the clock unit 320, and a communication unit 322. The imaging device 300 includes various equipment having an imaging function such as a digital camera or a smartphone.

The control unit 302 comprises, for example, a CPU and an ASIC. The control unit 302 controls each part of the imaging device 300. This control unit 302 includes the image acquisition unit 102, the image recognition unit 104, and the character information acquisition unit 106 of the image processing apparatus 100 shown in FIG. 1. In addition, the control unit 302 includes an imaging control unit 3023, an image processing unit 3024, a display control unit 3025, and a communication control unit 3026. The imaging control unit 3023 controls the imaging operation by the imaging unit 304. The image processing unit 3024 performs image processing necessary for display and recording for the image acquired by the imaging unit 304. This image processing includes, for example, corrections regarding image quality such as white balance correction, gradation correction, and color correction, resize processing, compression processing, and expansion processing. The display control unit 3025 controls the display of various images on the display unit 306. The communication control unit 3026 performs control during a communication between the imaging device 300 and external equipment via the communication unit 322. The imaging device 300 is connected to the portable terminal 400 to be able to communicate therewith by the communication control unit 3026.

The imaging unit 304 images the subject to acquire an image (image data) regarding the subject. This imaging unit 304 includes an imaging lens 3041, an image pickup device 3042, and an analog/digital (A/D) conversion unit 3043. The imaging lens 3041 collects a light flux from the subject into the image pickup device 3042. The image pickup device 3042 has a light receiving surface. Pixels are arranged in the light receiving surface. The pixels are, for example, photodiodes, and output electric signals (image signals) corresponding to the amount of incident light. The analog/digital (A/D) conversion unit 3043 converts an analog image signal obtained by the image pickup device 3042 into a digital image signal (image data).

The display unit 306 is, for example, a liquid crystal display or an organic EL display, and is provided in, for example, the back surface of the imaging device 300. This display unit 306 displays images on the basis of various image data. The eyepiece display unit 308 is, for example, a liquid crystal display or an organic EL display, and is, for example, a look-in type display unit provided in the back surface of the imaging device 300. In the same manner as the display unit 306, this eyepiece display unit 308 displays images on the basis of various image data. The image data for use in the display in the display unit 306 or the eyepiece display unit 308 are image data obtained by imaging in the imaging unit 304 or image data recorded in the recording unit 310.

The recording unit 310 is, for example, a flash memory, and records the image data as files. In the recording unit 310, a connection destination database (DB) 3101 and an image database (DB) 3102 are constructed. A part of a recording area of the recording unit 310 is a model information recording unit 3103. The connection destination DB 3101 is a database storing address information and others necessary to communicate with equipment (the portable terminal 400) which is a target for communication with the imaging device 300. The image DB 3102 is a database storing characteristic amount data and others for various targets necessary for image recognition by the image recognition unit 104. The model information recording unit 3103 is a recording area to record model information regarding the imaging device 300 which has taken an image to be a target which should be acquired the guide information. The model information includes the model name of the imaging device 300 and the feature information (e.g. a focal distance) for the imaging lens 3041. The recording unit 310 may be incorporated in the imaging device 300 or may be attachable to and detachable from the imaging device 300.

The operation unit 312 is a mechanical operational component for the user to operate the imaging device 300. The operation unit 312 includes, for example, a release button and a power supply switch. The release button is a button for the user to instruct to perform a photography operation. The power supply switch is a switch for the user to instruct to turn on or off the power supply of the imaging device 300.

The touch panel 314 is formed, for example, in a display screen of the display unit 306, and detects a touch operation by the user. The control unit 302 performs processing corresponding to the touch operation detected by the touch panel 314. For example, the touch panel 314 is used instead of the release button. Moreover, the touch panel 314 is used by the user to specify a certain part of the image displayed in the display screen of the display unit 306.

The posture detection unit 316 is, for example, a three-axis acceleration sensor or a gyro-sensor, and detects the posture and motion of the imaging device 300. Information regarding the angle of elevation of the apparatus can be output by the posture detection unit 316. The posture detection unit 316 can judge the difference between a blossom at a high position and a blossom at a low position, and can also be used to judge flying objects or heavenly bodies as described above. It is necessary to judge after correcting the motion of equipment to properly recognize the motion of the target. For this purpose as well, such a sensor is significantly important. The position detection unit 318 detects the current position of the imaging device 300 by, for example, the GPS. This permits such classification as local areas, high mountain areas, mountain areas, forest areas, rural areas, urban areas, seaside, lakes and marshes, and riverside. Such classification is significantly important information for effective word extraction in, for example, the identification of plants and animals. The azimuth of the imaging device 300 may be detectable by, for example, the position detection unit 318. This is important information for, for example, heavenly bodies, and can be used to extract information regarding whether a person is looking at the sea or the land in the case of photography at the seaside. This is particularly essential for the specification of a certain point (landmark) on the map. The clock unit 320 acquires the current time (including the date). This naturally serves as information regarding the season together with positional information. In the case of heavenly bodies, this is closely related to the azimuth. All such information is important secondary information to derive words and text information for image specification. Such information is read as texts such as "mountain areas", "fly", and "spring" that have been shown by way of example, by the dictionary prepared in the image DB 3102. The communication unit 322 corresponds to the communication unit 108, and communicates with the portable terminal 400 under the control of the communication control unit 3026. The communication unit 322 is, for example, a wireless LAN interface. The communication unit 322 may be a wired interface such as a USB.

The portable terminal 400 has a function as the guide information retrieval device 200, and includes a control unit 402, a recording unit 404, a display unit 406, a touch panel 408, a communication unit 401, and a communication unit 412. The portable terminal 400 includes various equipment having an information presentation function such as a smartphone. Although the portable terminal 400 in FIG. 2 includes no imaging unit, the portable terminal 400 may include an imaging unit.

The control unit 402 comprises, for example, a CPU. This control unit 402 controls each part of the portable terminal 400. This control unit 402 includes the retrieval unit 204 of the guide information retrieval device 200 shown in FIG. 1. This retrieval unit 204 extracts and retrieves characteristic information obtained from an image or text, characters or words corresponding to the secondary information from the image dictionary (image DB 3102). The retrieval is a technique to fetch a result obtained from a correspondence table, but a certain calculation may be performed to extract a result; for example, a season is derived from the previously mentioned areal information and date information. In addition, the control unit 402 includes a communication control unit 4022. The communication control unit 4022 performs control during communication with the imaging device 300 or the server 500.

The recording unit 404 is, for example, a hard disk. A guide information database (DB) 4041 as the storage unit 202 is constructed in the recording unit 404. The guide information DB 4041 is a database to retrieve guide information. The guide information is associated with various character information. This may be information in the world of what is known as collective intelligence, and various know-how may be written in SNSs such as Q&A sites and blogs which are network services. The above information may be recorded, or the advice written here has only to be retrieved on the Internet and displayed or reproduced. This may be character display or sound reproduction.

The display unit 406 which functions as the presentation unit 206 is, for example, a liquid crystal display or an organic EL display. This display unit 406 displays images on the basis of various image data. The touch panel 408 is formed, for example, in a display screen of the display unit 406, and detects a touch operation by the user. The control unit 402 performs processing corresponding to the touch operation detected by the touch panel 408.

The communication unit 401 communicates with the imaging device 300 under the control of the communication control unit 4022. The communication unit 412 communicates with the server 500 under the control of the communication control unit 4022. The communication unit 401 is, for example, a wireless LAN interface. The communication unit 412 is, for example, a mobile telephone line.

The server 500 includes a control unit 502, a recording unit 504, and a communication unit 506.

The control unit 502 comprises, for example, a CPU and controls each part of the server 500. This control unit 502 includes a communication control unit 5021. The communication control unit 5021 performs control during communication with the portable terminal 400. The recording unit 504 is, for example, a hard disk. This recording unit 504 stores various information to be retrieved by the retrieval unit 204. The communication unit 506 communicates with the portable terminal 400 under the control of the communication control unit 5021.

Figure 3A:
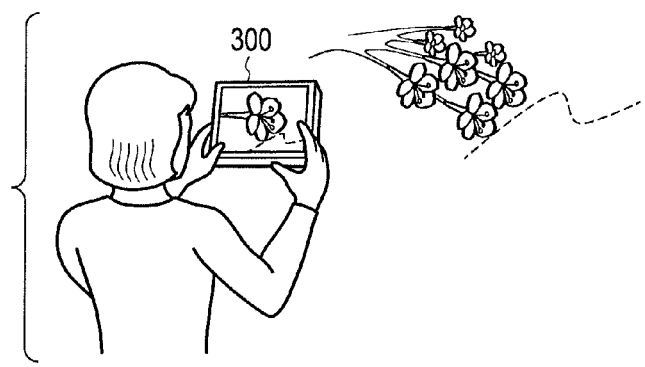
FIG. 3A is a first diagram showing an overview of the operation of the communication system.

The operation of the communication system according to the present embodiment is described below. Suppose that the user has the imaging device 300 and the portable terminal 400. In this state, the user directs the imaging device 300 toward the subject (a blossom in the drawings) as shown in FIG. 3A to photograph the subject. Suppose here that the user is to take a cherry blossom.

In this instance, the image recognition unit 104 of the imaging device 300 extracts characteristic information regarding the subject and others from an image obtained via the imaging unit 304. The characteristic information includes various information that can be converted into character information, such as the shape and color of the subject, and the distance from the imaging device 300 to the subject. It is possible to estimate the size of the target from the distance and the size in the screen, and if such information is retrieved together, a hibiscus blossom is not mistaken for a cherry blossom, for example. The characteristic information is not exclusively acquired from images. For example, when positional information has been acquired in the position detection unit 318 or when the current time has been acquired in the clock unit 320, the current positional information and the current time information may be the characteristic information. After the extraction of the characteristic information, the image recognition unit 104 sends the extracted characteristic information to the character information acquisition unit 106. The character information acquisition unit 106 acquires character information from various characteristic information recognized by the image recognition unit 104. For example, in the example of FIG. 3B, "blossom" which is character information representing the name of the subject and "pink" which is character information representing the color of the subject are extracted. In addition, "blue sky" and others which are character information representing the background are also extracted. In the case of information such as distance information converted into a numerical value, this numerical value is extracted as character information. Characters indicating a blossom of a tall tree may be extracted and retrieved from the apparatus elevation angle information.

After the acquisition of the character information, the communication control unit 3026 sends the character information acquired in the character information acquisition unit 106 to the portable terminal 400 by the communication unit 322. In this instance, the communication control unit 3026 may also send model information recorded in the model information recording unit 3103 to the portable terminal 400 as character information.

Figure 3B:
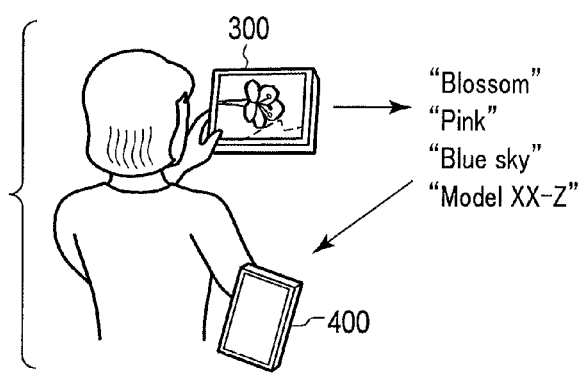
FIG. 3B is a second diagram showing an overview of the operation of the communication system.
Figure 3C:
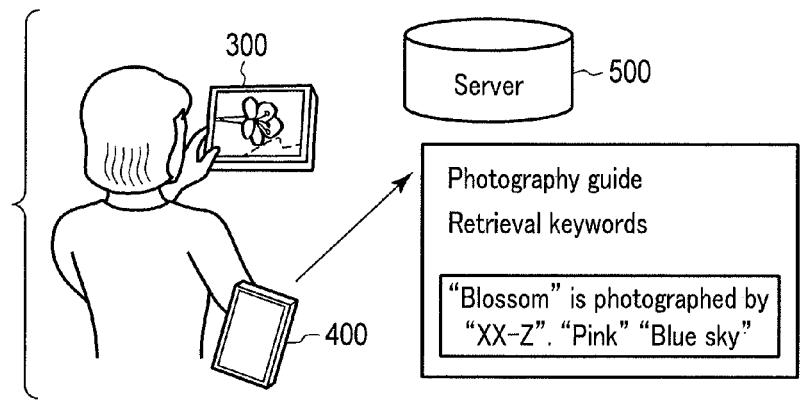
FIG. 3C is a third diagram showing an overview of the operation of the communication system.

Having received the character information from the imaging device 300, the retrieval unit 204 of the portable terminal 400 retrieves guide information from the guide information DB 4041 using the character information acquired from the imaging device 300 as retrieval keywords as shown in FIG. 3C. For example, if the name of the subject is "blossom" and the model name of the imaging device 300 is "XX-Z", the retrieval unit 204 conducts search with retrieval keywords such as "photograph 'blossom' with 'XX-Z'" and "pink". As described above, the retrieval unit 204 may conduct search on the Web by communication with the server 500.

Figure 3D:
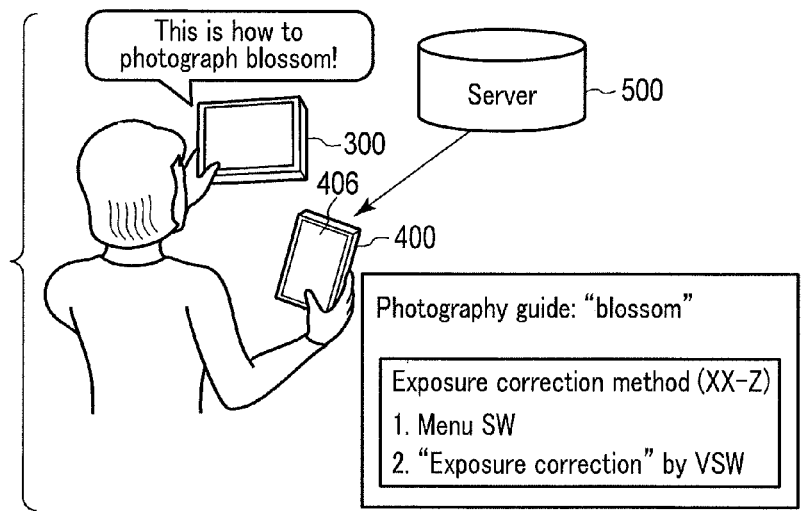
FIG. 3D is a fourth diagram showing an overview of the operation of the communication system.

Having finished the retrieval of the guide information, the control unit 402 of the portable terminal 400 displays the retrieved guide information on the display unit 406 as shown in FIG. 3D. This permits the user to know how to photograph the blossom with the model "XX-Z" as the guide information. In the present embodiment, the imaging device 300 only acquires character information to retrieve guide information and then sends the character information to the portable terminal 400, and does not retrieve the guide information. Moreover, the imaging device 300 only sends the character information. Therefore, the load of communication in the imaging device 300 is considerably reduced.

Figure 4:
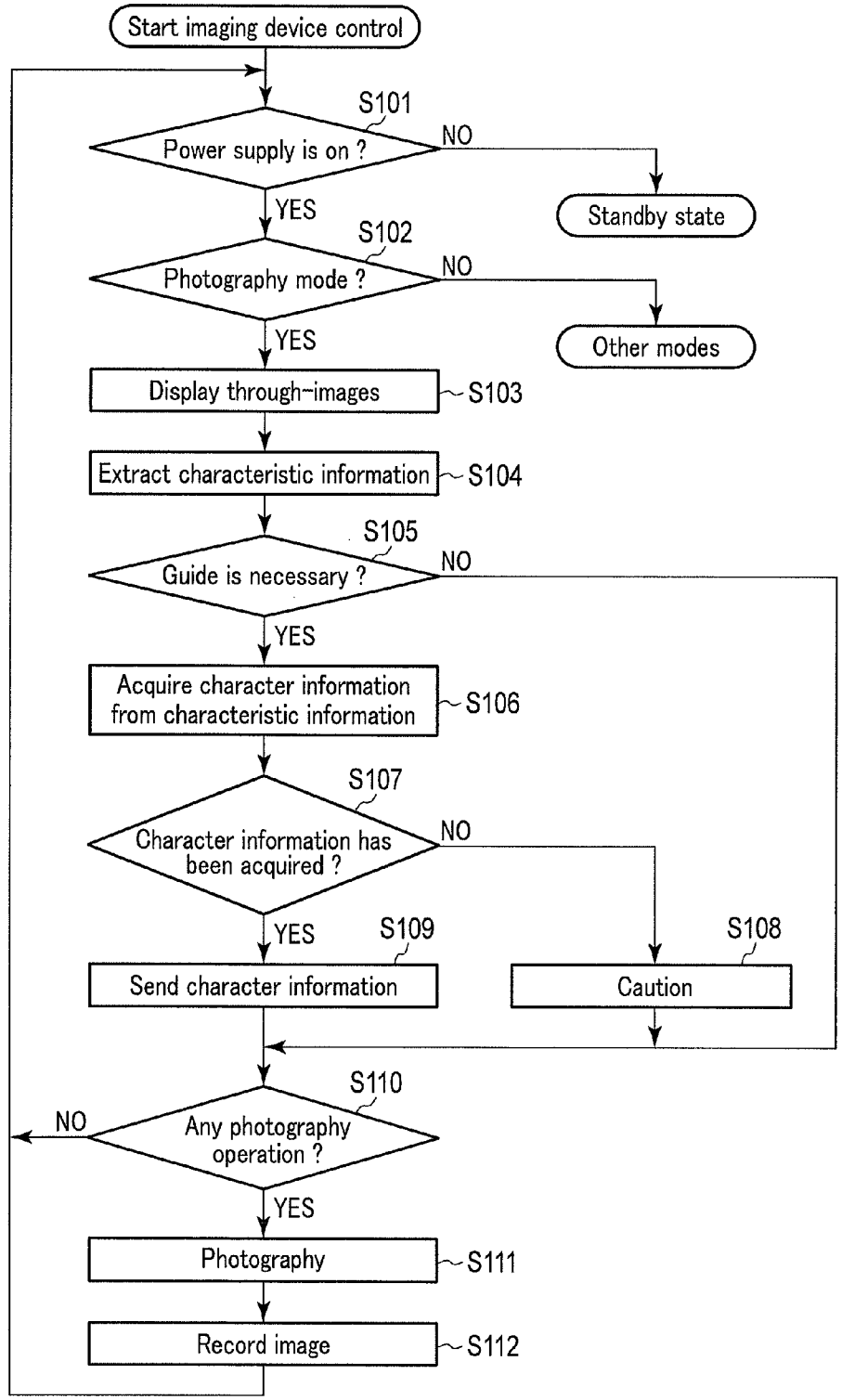
FIG. 4 is a flowchart showing the control of an imaging device according to the first embodiment.

Details of the operation of the communication system according to the present embodiment are described below. FIG. 4 is a flowchart showing the control of the imaging device 300. The processing in FIG. 4 is performed in accordance with a program prestored in the control unit 302.

In FIG. 4, the control unit 302 judges whether the power supply switch has been turned on (step S101). When judging in step S101 that the power supply switch has not been turned on, the control unit 302 shifts the imaging device 300 to a standby state. In the standby state, minimum necessary functions in the imaging device 300 such as the judgment in step S101 are only performed.

When judging in step S101 that the power supply switch has been turned on, the control unit 302 judges whether the operation mode of the imaging device 300 is a photography mode (step S102). The photography mode is an operation mode to take images for recording. The operation mode of the imaging device 300 is determined in accordance with, for example, the operation of the operation unit 312 or the touch panel 314 by the user. When judging in step S102 that the operation mode of the imaging device 300 is not the photography mode, the control unit 302 performs processing corresponding to an operation mode other than the photography mode. The operation mode other than the photography mode is, for example, a reproduction mode. The reproduction mode is not described in detail.

When judging in step S102 that the operation mode of the imaging device 300 is the photography mode, the control unit 302 performs through-image display (step S103). The through-image display is an operation to display images obtained by successive operation of the imaging unit 304 on the display unit 306 in real time. At the time of the through-image display, the control unit 302 acquires, by the image acquisition unit 102, the images obtained in the imaging unit 304 during the through-image display. The control unit 302 then extracts, by the image recognition unit 104, characteristic information from the images acquired by the image acquisition unit 102 (step S104).

The control unit 302 then judges whether the user is requesting guide information (step S105). For example, when the guide information is requested in accordance with the operation of the operation unit 312 or the touch panel 314 by the user, it is judged that the user is requesting the guide information. When judging in step S105 that the user is not requesting the guide information, the control unit 302 skips the processing in step S106 to S109. In contrast, when judging in step S105 that the user is requesting the guide information, the control unit 302 acquires, by the character information acquisition unit 106, character information from the characteristic information extracted by the image recognition unit 104 (step S106). The control unit 302 then judges whether the character information has been acquired (step S107). When judging in step S107 that the character information has not been acquired, the control unit 302 cautions the user that the character information has not been acquired, that is, the guide information cannot be acquired (step S108). The caution is given, for example, by use of display or sound. After the caution, the control unit 302 shifts the processing to step S110.

When judging in step S107 that the character information has been acquired, the control unit 302 sends, by the communication control unit 3026, the character information acquired by the character information acquisition unit 106 to the portable terminal 400 (step S109). The following application is naturally possible: information that can be converted into characters such as the color, shape, size, and a distance distribution are only sent out of the image information, and the image information itself is sent as secondary information. In this case, the image information may be edges alone or a color distribution alone. The time, place, temperature, humidity, atmospheric pressure, azimuth, and inclination that have been secondarily obtained may be sent as character information. For example, if "when it is hot" converted from the temperature information and "high in the sky" converted from the elevation angle information are sent, various text searches, Internet searches, and natural-language searches become easier. It is also important to convert the photography mode and others into text forms, and if, for example, "macro photography" or "wide photography" is sent as characters from the mode name and photography parameters, information amount increases, information can be narrowed down, and, for example, photography results in similar photography methods are easily retrieved.

When judging in step S105 that the user is not requesting the guide information, the control unit 302 judges after step S108 or S109 whether there is any photography operation by the user (step S110). The photography operation is, for example, an operation to press a release button by the user or a touch release operation using the touch panel 314. When judging in step S110 that there is no photography operation by the user, the control unit 302 returns the processing to step S101.

When judging in step S110 that there is a photography operation by the user, the control unit 302 performs the photography operation (step S111). The photography operation is an operation to control the imaging unit 304 to acquire image data for recording. After the execution of the photography operation, the control unit 302 performs, by the image processing unit 3024, image processing for the image data obtained by the photography operation. The control unit 302 then records the image data after the image processing in the recording unit 310 (step S112). The control unit 302 then returns the processing to step S101.

Figure 5:
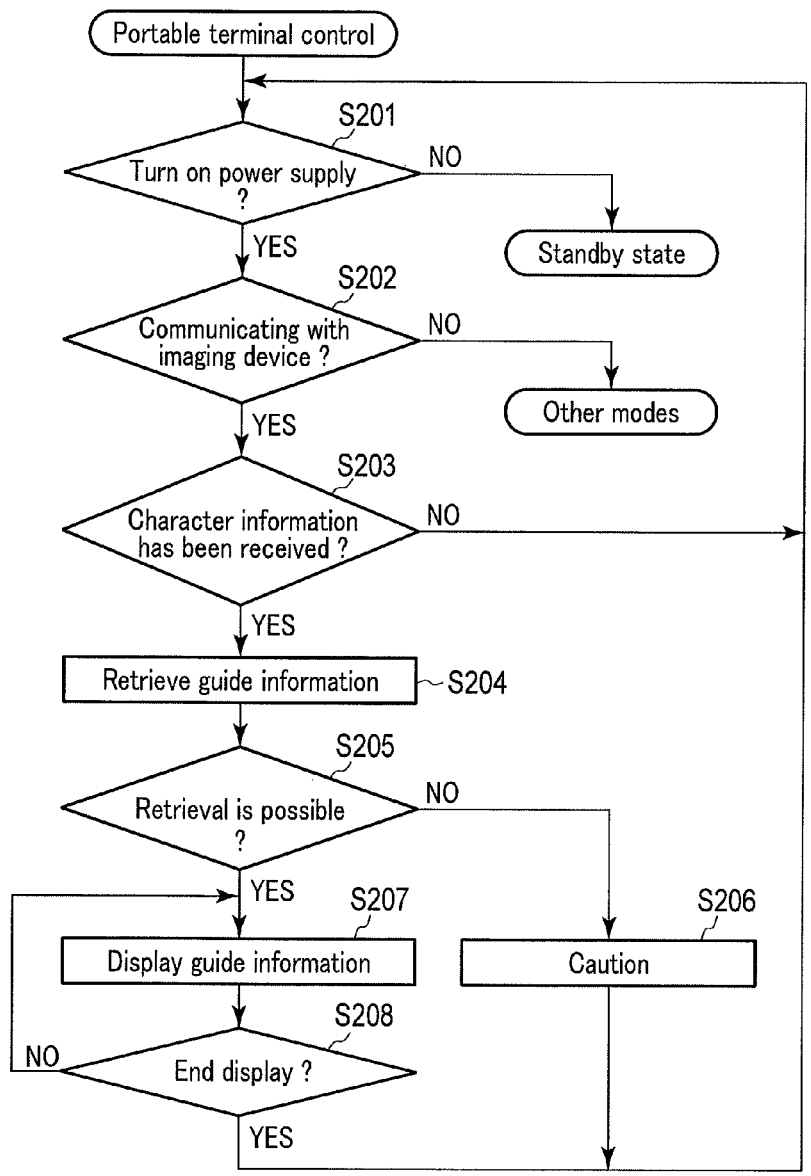
FIG. 5 is a flowchart showing the control of a portable terminal according to the first embodiment.

FIG. 5 is a flowchart showing the control of the portable terminal 400. The processing in FIG. 5 is performed in accordance with a program prestored in the control unit 402.

In FIG. 5, the control unit 402 judges whether to turn on the power supply (step S201). When judging in step S201 that the power supply is not to be turned on, the control unit 402 shifts the portable terminal 400 to a standby state. In the standby state, minimum necessary functions in the portable terminal 400 such as the judgment in step S201 are only performed.

When judging in step S201 that the power supply is to be turned on, the control unit 402 turns on the power supply of the portable terminal 400. The control unit 402 then judges whether the portable terminal 400 is communicating with the imaging device 300 (step S202). When judging in step S202 that the portable terminal 400 is not communicating with the imaging device 300, the control unit 402 performs processing corresponding to an operation mode other than the mode of communication with the imaging device 300. The operation mode other than the communication mode is not described in detail.

When judging in step S202 that the portable terminal 400 is communicating with the imaging device 300, the control unit 402 judges whether the character information has been received from the imaging device 300 (step S203). When judging in step S203 that the character information has not been received, the control unit 402 returns the processing to step S201.

When judging in step S203 that the character information has been acquired, the control unit 402 retrieves guide information by the retrieval unit 204 using the received character information (step S204). As described above, the guide information is not only retrieved from the guide information DB 4041 but can also be retrieved on the Web by the server 500. After the retrieval of the guide information, the control unit 402 judges whether the guide information has been retrieved (step S205). When judging in step S205 that the guide information has not been retrieved, the control unit 402 cautions that the guide information has not been acquired (step S206). The caution is given, for example, by use of display or sound. After the caution, the control unit 402 shifts the processing to step S201.

When judging in step S205 that the guide information has been retrieved, the control unit 402 displays the retrieved guide information on the display unit 406 as shown in FIG. 3D (step S207). This guide information may be advice in photography and observation, and is not limited to the name or explanation of the target obtained during photography and observation, but may show what is present beyond, show the historical background, or show the relation with works of art. This may be displayed on the imaging device 300 instead of the portable terminal 400. When there is associated equipment around or there is remote but associated equipment, information may be wirelessly transmitted and displayed there. For example, if this is applied to a system which displays, on a large monitor provided in a workplace, images taken on a business trip together with information related with what has been photographed at the time, it may be helpful in, for example, a meeting. For example, what is the flower in a bouquet of a bride photographed in a wedding is projected on a projector.

After the display of the guide information, the control unit 402 judges whether to end the display of the guide information (step S208). For example, when the end of the display of the guide information is requested in accordance with the operation of the touch panel 408 by the user, it is judged that the display of the guide information is to be ended. When judging in step S208 that the display of the guide information is not to be ended, the control unit 402 returns the processing to step S207 to continue the display of the guide information. When judging in step S208 that the display of the guide information is to be ended, the control unit 402 returns the processing to step S201.

As described above, according to the present embodiment, it is possible to acquire the guide information by use of an image recognition result. Here, in the present embodiment, the guide information is acquired by the guide information retrieval device 200. Thus, information to acquire the guide information does not need to be stored in the image processing apparatus 100. The communication that takes place in the image processing apparatus 100 is only the communication to send the character information to the portable terminal 400. Therefore, the load of communication in the image processing apparatus 100 can be reduced.

Next, modifications of the present embodiment are described.

[Modification 1]

In the embodiment described above, the guide information is displayed on the display unit 406 of the portable terminal 400 as the guide information retrieval device 200. In contrast, although communication with the imaging device 300 as the image processing apparatus 100 takes place, the guide information acquired in the portable terminal 400 may be displayed in the display unit 306 or the eyepiece display unit 308 of the imaging device 300. Especially when the guide information is displayed on the eyepiece display unit 308, the displayed guide information is not subject to external light. Thus, the user can view the clear guide information.

[Modification 2]

FIG. 3A to FIG. 3C show examples in which the user separately owns the imaging device 300 and the portable terminal 400. In contrast, the imaging device 300 and the portable terminal 400 may be used as shown in FIG. 6A to FIG. 6C.

FIG. 6A shows the exterior of the imaging device 300 according to Modification 2. The imaging device 300 shown in FIG. 6A is an "interchangeable-lens-shaped" imaging device. Each processing block of the imaging device 300 shown in FIG. 2 is provided inside an interchangeable-lens-shaped housing. In the case of the interchangeable-lens-shaped imaging device 300, it is not necessary that all the processing blocks shown in FIG. 2 be provided. For example, the display unit 306, the eyepiece display unit 308, the touch panel 314, the posture detection unit 316, the position detection unit 318, and the clock unit 320 may be absent (may be present). In the meantime, FIG. 6B shows the exterior of the portable terminal 400. The portable terminal 400 according to Modification 2 is, for example, a smartphone, and has the same configuration as the portable terminal 400 shown in FIG. 2.

As shown in FIG. 6C, the imaging device 300 according to Modification 2 is attached to the portable terminal 400 via an attachment 600. In such a configuration, an image taken by the imaging device 300 is sent to the portable terminal 400. That is, the imaging device 300 and the portable terminal act as one digital camera.

FIG. 7 is a flowchart showing the control of the imaging device 300 according to Modification 2. The processing in FIG. 7 is performed in accordance with a program prestored in the control unit 302.

In FIG. 7, the control unit 302 judges whether the power supply has been turned on (step S301). For example, when a power supply switch is provided in the imaging device 300, whether the power supply switch has been turned on is judged. When judging in step S301 that the power supply has not been turned on, the control unit 302 shifts the imaging device 300 to a standby state.

When judging in step S301 that the power supply has been turned on, the control unit 302 sends through-images to the portable terminal 400 by the communication control unit 3026 (step S302). In this instance, the control unit 302 acquires, by the image acquisition unit 102, the through-images acquired in the imaging unit 304. The control unit 302 then extracts, by the image recognition unit 104, characteristic information from the images acquired by the image acquisition unit 102 (step S303).

The control unit 302 then judges whether the user is requesting guide information (step S304). For example, when a guide request from the portable terminal 400 is received, it is judged that the user is requesting the guide information. When judging in step S304 that the user is not requesting the guide information, the control unit 302 skips the processing in step S305 to S308. In contrast, when judging in step S304 that the user is requesting the guide information, the control unit 302 acquires, by the character information acquisition unit 106, character information from the characteristic information extracted by the image recognition unit 104 (step S305). The control unit 302 then judges whether the character information has been acquired (step S306). When judging in step S306 that the character information has not been acquired, the control unit 302 sends, to the portable terminal 400 by the communication control unit 3026, caution information indicating that the character information has not been acquired (step S307). After the caution information has been sent, the control unit 402 shifts the processing to step S309. The acquisition of the character information is not so difficult, and the time of photography may be converted into, for example, "spring" or "early summer" as seasonal information, and can be readily converted into characters such as "early in the morning" or "in the evening". The character information may only be a color such as "yellow" or a shape such as "round". "Bright" or "moving", for example, can be said to be information that can be easily obtained in photography. Distance information is often obtained during photography, and such changes with time may be image information. The extraction and retrieval of these characters and texts are as has been described with reference to FIG. 1. That is, this recognition includes processing to recognize not only coordinate information for what is known as image feature points of the colors of target images included in an image and their distribution, and the edges and contrast changes of the target images, but also information that can be converted into numerical values, such as the distance to the target at the time of the acquisition of the image, the position of the acquisition of the image, and the time of the acquisition of the image. The character information acquisition unit 106 acquires character information using the result of recognition in the image recognition unit 104 and the later-described image database (image dictionary 3102), but can also retrieve candidate words from relevant information (secondary information) obtained during photography as well as the color, characteristics, and size obtained from the image of the target in the image recognition unit 104. For example, characteristics of the shape of petals are detected. If the their color is pink, a "cherry blossom" may not be recognized, but the image dictionary is searched in accordance with the characteristics of the image, and text information such as "pink" and "blossom" are retrieved. Alternatively, words that modify motions such as "flutter" and "fiercely" can be extracted from the frequency of the motion obtained in moving images. Furthermore, it is also possible to use date information in the clock unit 320 for conversion into words such as "April" or "spring", or use information regarding the size and distance of the target in a screen for conversion into text information such as "the size of one blossom is 2.5 cm". If such recognition is conducted, the character information acquisition unit 106 can search an exclusive database for character information such as the name of the target from the result of target recognition, or extract or acquire a combination of several pieces of information by calculation in a certain flow. Such a dictionary may be a part of the "image recognition unit" or the "character information acquisition unit", and may bring advantageous effects in cooperation with the above.

When judging in step S306 that the character information has been acquired, the control unit 302 sends, by the communication control unit 3026, the character information acquired by the character information acquisition unit 106 to the portable terminal 400 (step S308).

When judging in step S304 that the user is not requesting the guide information, the control unit 302 judges after step S307 or S308 whether there is any photography instruction from the portable terminal 400 (step S309). When judging in step S309 that there is no photography instruction, the control unit 302 returns the processing to step S301.

When judging in step S309 that there is a photography instruction, the control unit 302 performs the photography operation (step S310). After the execution of the photography operation, the control unit 302 performs, by the image processing unit 3024, image processing for the image data obtained by the photography operation. The control unit 302 then sends the image data after the image processing to the portable terminal 400 by the communication control unit 3026 (step S311). The control unit 302 then returns the processing to step S301.

Figure 8A:
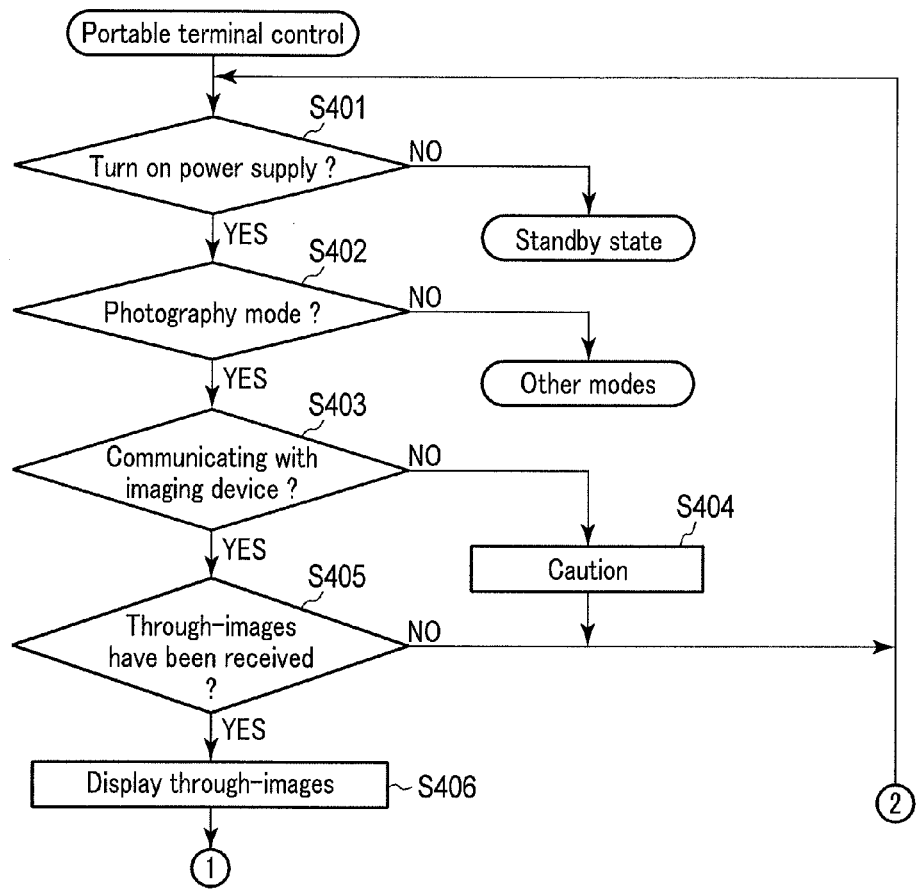
FIG. 8A is a first diagram of a flowchart showing the control of the portable terminal according to Modification 2 of the first embodiment.
Figure 8B:
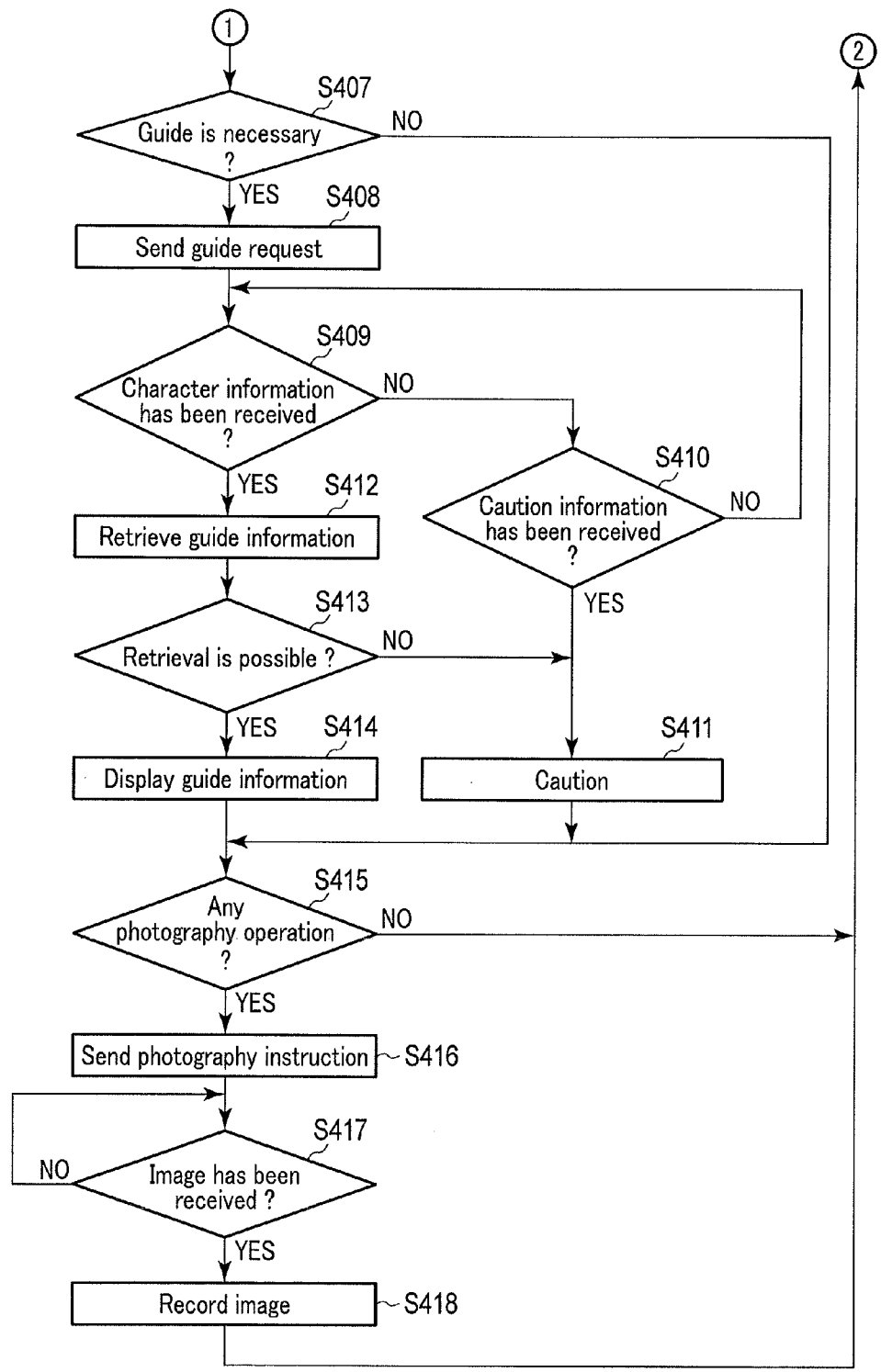
FIG. 8B is a second diagram of a flowchart showing the control of the portable terminal according to Modification 2 of the first embodiment.

FIG. 8A and FIG. 8B are flowcharts showing the control of the portable terminal 400 according to Modification 2. The processing in FIG. 8A and FIG. 8B is performed in accordance with a program prestored in the control unit 402.

In FIG. 8A, the control unit 402 judges whether to turn on the power supply (step S401). When judging in step S401 that the power supply is not to be turned on, the control unit 402 shifts the portable terminal 400 to a standby state.

When judging in step S401 that the power supply is to be turned on, the control unit 402 turns on the power supply of the portable terminal 400. The control unit 402 then judges whether the operation mode of the portable terminal 400 is the photography mode (step S402). The operation mode is set, for example, in accordance with the operation of the touch panel 408 by the user. When judging in step S402 that the operation mode is not the photography mode, the control unit 402 performs processing corresponding to an operation mode other than the photography mode. The operation mode other than the photography mode is not described in detail.

When judging in step S402 that the operation mode is the photography mode, the control unit 402 judges whether the portable terminal 400 is communicating with the imaging device 300 (step S403). When judging in step S403 that the portable terminal 400 is not communicating with the imaging device 300, the control unit 402 cautions the user that the portable terminal 400 is not communicating with the imaging device 300 (step S404). The control unit 402 then returns the processing to step S401.

When judging in step S403 that the portable terminal 400 is communicating with the imaging device 300, the control unit 402 judges whether through-images have been received from the imaging device 300 (step S405). When judging in step S405 that the through-images have not been received, the control unit 402 returns the processing to step S401. When judging in step S405 that the through-images have been received, the control unit 402 displays the received through-images on the display unit 406 (step S406).

The control unit 402 then judges whether the user is requesting guide information (step S407). For example, when the guide information is requested in accordance with the operation of the touch panel 408 by the user, it is judged that the user is requesting the guide information. When judging in step S407 that the user is not requesting the guide information, the control unit 402 skips the processing in step S408 to S414. In contrast, when judging in step S407 that the user is requesting the guide information, the control unit 402 sends the guide information to the imaging device 300 by the communication control unit 4022 (step S408).

After having sent the guide information, the control unit 402 judges whether the character information has been received from the imaging device 300 (step S409). When judging in step S409 that the character information has not been received, the control unit 402 judges whether caution information has been received from the imaging device 300 (step S410). When judging in step S410 that the caution information has not been received, the control unit 402 returns the processing to step S409 and then waits for character information to be received. When judging in step S410 that the caution information has been received, the control unit 402 cautions the user that the guide information cannot be acquired (step S411). The caution is given, for example, by use of display or sound. After the caution, the control unit 402 shifts the processing to step S415.

When judging in step S409 that the character information has been received, the control unit 402 retrieves guide information using the received character information by the retrieval unit 204 (step S412). The retrieval of the guide information in step S412 is similar to the retrieval of the guide information in step S204. After the retrieval of the guide information, the control unit 402 judges whether the guide information has been retrieved (step S413). When judging in step S413 that the guide information has not been retrieved, the control unit 402 shifts the processing to step S411 and gives a caution.

When judging in step S413 that the guide information has been retrieved, the control unit 402 displays the retrieved guide information on the display unit 406 as shown in FIG. 3D (step S414).

When judging in step S407 that the user is not requesting the guide information, the control unit 402 judges after step S411 or S414 whether there is any photography operation by the user (step S415). The photography operation is, for example, a touch release operation using the touch panel 408 by the user. When judging in step S415 that there is no photography operation by the user, the control unit 402 returns the processing to step S401.

When judging in step S415 that there is a photography operation by the user, the control unit 402 sends a photography instruction to the imaging device 300 by the communication control unit 4022 (step S416). After having sent the photography instruction, the control unit 402 judges whether image data has been received from the imaging device 300 (step S417). The control unit 402 repeats the judgment in step S417 until judging in step S417 that the image data has been received from the imaging device 300. The processing may be shifted to step S401 when the image data has not been received within a predetermined time.

When judging in step S417 that the image has been received from the imaging device 300, the control unit 402 records the received image data in the recording unit 404 (step S418). The control unit 402 then returns the processing to step S401.

As described above, even in the configuration according to Modification 2, it is possible to obtain advantageous effects similar to those in the previously described embodiment. The imaging device 300 allows a higher degree of freedom in the designs of the image pickup device and the imaging lens than the portable terminal 400. It is therefore possible to provide an imaging unit having a higher function than in the portable terminal 400. When provided with the imaging unit having a higher function, the imaging device 300 can take images of higher quality than the portable terminal 400. By sending such high-quality images to the portable terminal 400, it is possible to display high-quality through-images on the display unit 406 of the portable terminal 400, or record high-quality images in the recording unit 404.

Second Embodiment

Figure 9:
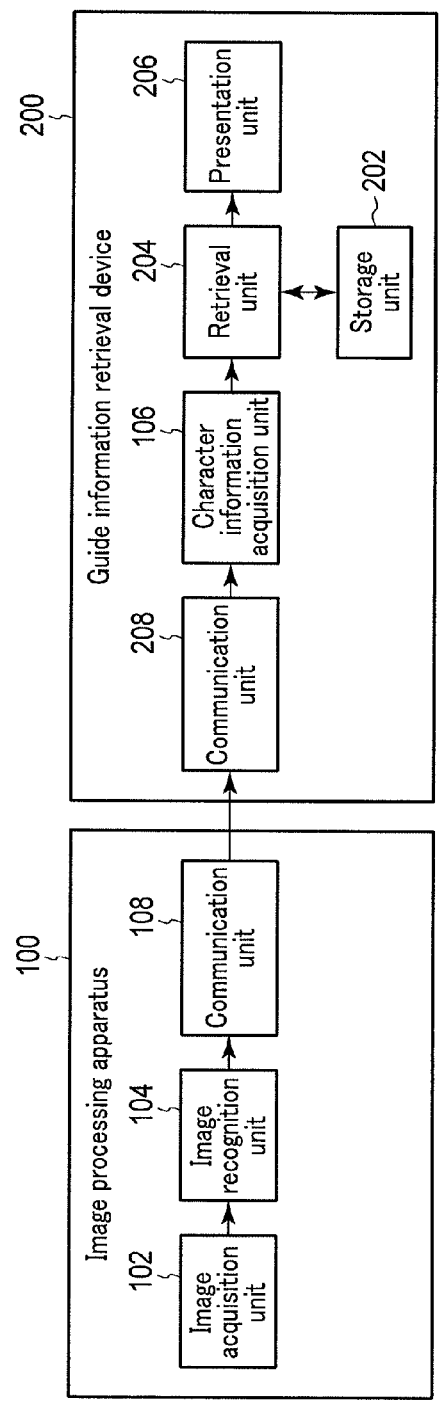
FIG. 9 is a functional block diagram of the communication system including the image processing apparatus according to a second embodiment of the present invention.

Next, the second embodiment of the present invention is described. FIG. 9 is a functional block diagram of the communication system including the image processing apparatus according to the second embodiment of the present invention. FIG. 10 is a diagram showing the configuration of the communication system which is an application example of the image processing apparatus 100 and the guide information retrieval device 200 shown in FIG. 9. Parts different from those in the first embodiment are only described FIG. 9 and FIG. 10. As shown in FIG. 9 and FIG. 10, the character information acquisition unit 106 is provided in the guide information retrieval device 200 (portable terminal 400) in the second embodiment. This also applies to FIG. 1. In such a configuration, the image processing apparatus 100 according to the second embodiment performs processing up to the recognition of the target in the image recognition unit 104. The guide information retrieval device 200 then acquires character information and retrieves guide information.

In the aforementioned present embodiment as well, the guide information can be acquired by use of an image recognition result. The communication that takes place in the image processing apparatus 100 is only the communication to send the characteristic information to the guide information retrieval device 200. Therefore, the load of communication in the image processing apparatus 100 can be reduced.

The configuration described in the second embodiment may be combined with the configurations described in Modification 1 and Modification 2 of the first embodiment.

Although the aspect of the image processing apparatus is emphasized in the embodiments described above, the techniques according to the embodiments described above are also applicable to, for example, the fields of industrial equipment and medical equipment other than consumer usage as an image display apparatus, an inspection apparatus, and a caution apparatus. Enrichment of the information amount at the time of a text-based search and narrow-down information for information can increase the precision at the time of display, an inspection, and caution. It is also possible to set a specification such that secondary information is unknowingly sent without any portable communication terminal such as a smartphone on hand each time. For example, when an inspection cannot be satisfactorily conducted, an image of a failed inspection is judged from images and from information at the time of photography, and a judgment, for example, "failure" may be sent. Such an application is within the scope covered by the technique of the present application, and it would be convenient if advice to prevent any failure were displayed when a terminal was taken out.

Third Embodiment

Next, the third embodiment of the present invention is described. FIG. 11 is a functional block diagram of an imaging device according to the third embodiment of the present invention. An imaging device 700 includes an imaging unit 702, a switch unit 704, a recording unit 706, an image recognition unit 708, a retrieval unit 710, and a presentation unit 712.

The imaging unit 702 images a target, and acquires an image of the target. The switch unit 704 switches the usage of the image acquired by the imaging unit 702 by switching the operation mode of the imaging device 700. The imaging device 700 has a photography mode and a guide information retrieval mode as operation modes. In the photography mode, an image for recording is acquired by a photography operation by the user. In the photography mode, the switch unit 704 inputs the image obtained in the imaging unit 702 to the recording unit 706 so that the image obtained in the imaging unit 702 can be recorded. In contrast, in the guide information retrieval mode, guide information is retrieved, and the retrieved guide information is presented to the user. In the guide information retrieval mode, the switch unit 704 inputs the image obtained in the imaging unit 702 to the image recognition unit 708 so that guide information can be retrieved.

The recording unit 706 records the image input from the switch unit 704 in the photography mode.

The image recognition unit 708 recognizes the image input by the switch unit 704 in the guide information retrieval mode. For example, this recognition includes processing to recognize the shape and color of a target in the image, processing to recognize characters in the image, and processing to recognize features of motion. This reception also includes processing to recognize information that can be converted into numerical values, such as the distance to the target at the time of the acquisition of an image, the position where the image has been acquired, and the time when the image has been acquired.

The retrieval unit 710 retrieves guide information by use of the recognition result in the image recognition unit 708. The guide information provides the user with a guidance on an imaging method, for example, how to photograph the target recognized by the image recognition unit 708. Otherwise, the guide information may be advice in photography and observation, and is not limited to the name or explanation of the target obtained during photography and observation, but may also show what is present beyond, show the historical background, or show the relation with works of art.

The presentation unit 712 presents information retrieved by the retrieval unit 710 to the user. This presentation is conducted by, for example, display.

Figure 12:
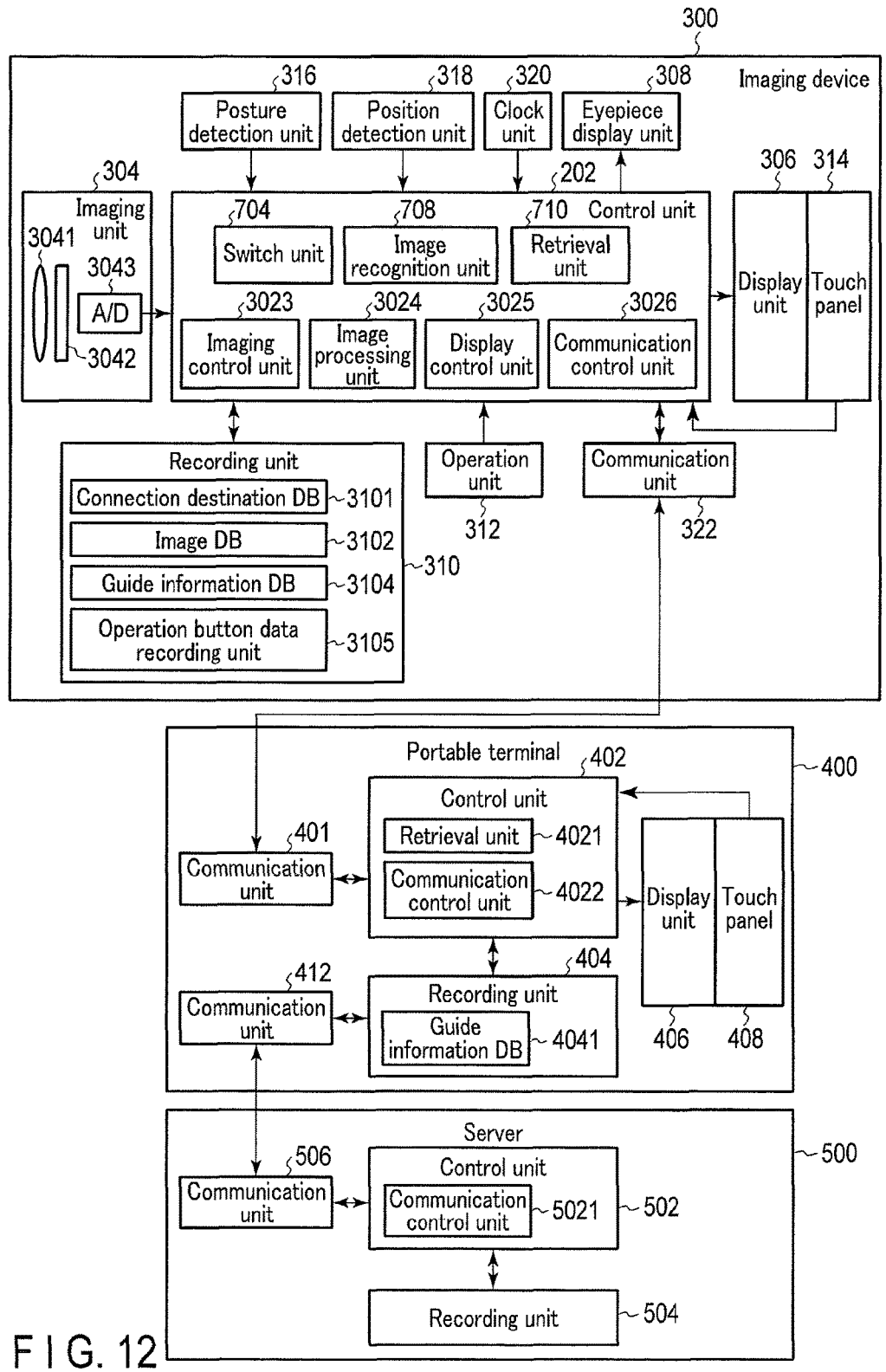
FIG. 12 is a diagram showing the configuration of the communication system including the imaging device as an application example of the imaging device according to the third embodiment.

FIG. 12 is a diagram showing the configuration of the communication system including the imaging device an application example of the imaging device shown in FIG. 11. As shown in FIG. 12, the communication system includes the imaging device 300, the portable terminal 400, and the server 500. The imaging device 300 and the portable terminal 400 are configured to communicate with each other. The portable terminal 400 and the server 500 are configured to communicate with each other.

The imaging device 300 has a function as the imaging device 700, and includes the control unit 302, the imaging unit 304, the display unit 306, the eyepiece display unit 308, the recording unit 310, the operation unit 312, the touch panel 314, the posture detection unit 316, the position detection unit 318, the clock unit 320, and the communication unit 322. The imaging device 300 includes various equipment having an imaging function such as a digital camera or a smartphone. Parts different from those in FIG. 2 are only described below.

The control unit 302 comprises, for example, a CPU and an ASIC. The control unit 302 controls each part of the imaging device 300. This control unit 302 includes the switch unit 704, the image recognition unit 708, and the retrieval unit 710 of the imaging device 700 shown in FIG. 11. In addition, the control unit 302 includes the imaging control unit 3023, the image processing unit 3024, the display control unit 3025, and the communication control unit 3026.

The recording unit 310 is, for example, a flash memory, and records the image data as files. In the recording unit 310, the connection destination database (DB) 3101, the image database (DB) 3102, and a guide information database (DB) 3104 are constructed. A part of the recording area of the recording unit 310 is an operation button data recording unit 3105. The connection destination DB 3101 is a database storing address information and others necessary to communicate with equipment (the portable terminal 400) which is a target for communication with the imaging device 300. The image DB 3102 is a database storing characteristic amount data and others regarding various targets necessary for image recognition by the image recognition unit 708. The guide information DB 3104 is a database to retrieve guide information from. The guide information DB 3104 includes a still image dictionary and a moving image dictionary. The still image dictionary is a dictionary storing characteristic information regarding a still image and guide information in association with each other. The characteristic information regarding the still image is information which does not involve any temporal change. This information which does not involve any temporal change is, for example, information such as the shape of the target obtained at the time of each imaging. The moving image dictionary is a dictionary storing characteristic information regarding moving images and guide information in association with each other. The characteristic information regarding the moving images is information which involves temporal changes. The characteristics which involve temporal changes are, for example, information regarding the change of the shape of the target throughout multiple imaging times. Alternatively, the "characteristics which involve temporal changes" may be paraphrased as the temporal change of the characteristic information for the target image. Character information and words that are retrieved accordingly may be adjectives or adverbs. A moving image dictionary to be assumed may associate the temporal change of the position of the target image and the frequency with imitative words such as "flutter" or "brr". Naturally, the character information may be changed depending on whether the whole target or a part of the target is swinging or whether the image is swinging vertically or horizontally. The operation button data recording unit 3105 is a record area to record icon data necessary to display, for example, icons on the display unit 306 such that the user can recognize a software button indicated by the touch panel 314. The recording unit 310 may be incorporated in the imaging device 300 or may be attachable to and detachable from the imaging device 300.

The portable terminal 400 includes control unit 402, the recording unit 404, the display unit 406, the touch panel 408, the communication unit 401, and the communication unit 412. The portable terminal 400 includes various equipment such as a smartphone. Although the portable terminal 400 in FIG. 12 includes no imaging unit, the portable terminal 400 may include an imaging unit.

The control unit 402 comprises, for example, a CPU. This control unit 402 controls each part of the portable terminal 400. This control unit 402 includes a retrieval unit 4021 and a communication control unit 4022. The retrieval unit 4021 has a function similar to that of the retrieval unit 710 shown in FIG. 11. That is, the retrieval unit 4021 retrieves guide information by use of information sent from the imaging device 300. The retrieval unit 4021 can also retrieve guide information from the server 500. The communication control unit 4022 performs control during communication with the imaging device 300 or the server 500.

The server 500 includes the control unit 502, the recording unit 504, and the communication unit 506.

Figure 13A:
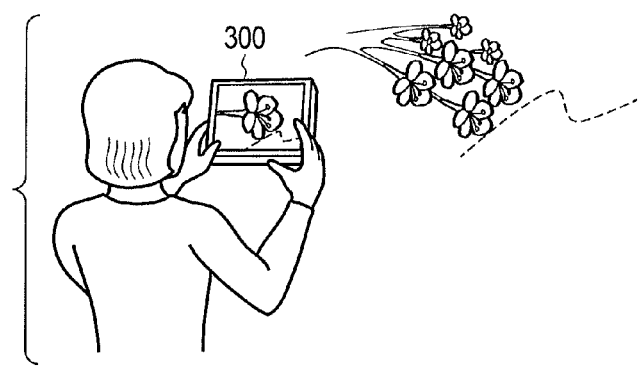
FIG. 13A is a first diagram showing an overview of the operation of the imaging device.

The operation of the communication system according to the present embodiment is described below. Suppose that the user owns the imaging device 300. In this state, the user directs the imaging device 300 toward the subject (a blossom in the drawings) as shown in FIG. 13A to photograph the subject. Suppose here that the user is to take a cherry blossom.

Figure 13B:
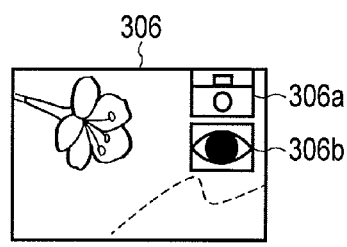
FIG. 13B is a second diagram showing an overview of the operation of the imaging device.

In the present embodiment, for example, when the power supply of the imaging device 300 is turned on, at least two icons are displayed on the display unit 306 as shown in FIG. 13B. The icons include a photography button 306a and a guide information retrieval button 306b. The user selects one of the icons. For example, when the photography button 306a is selected, photography is performed. When the guide information retrieval button 306b is selected, guide information is retrieved. In the present embodiment, guide information is retrieved by use of characteristic information regarding a still image and characteristic information regarding moving images. When the user owns the portable terminal 400, guide information can also be retrieved by the portable terminal 400.

Figure 13C:
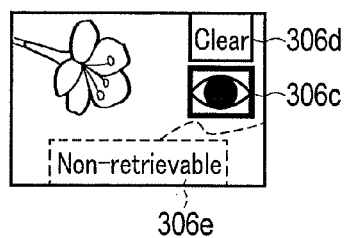
FIG. 13C is a third diagram showing an overview of the operation of the imaging device.

During the retrieval of guide information, a search-in-progress icon 306c is displayed as shown in FIG. 13C. By taking a look at the search-in-progress icon 306c, the user recognizes that guide information is being retrieved at present. A clear button 306d is also displayed during the retrieval of guide information. When the clear button 306d is selected by the user, history information storing characteristic information regarding moving images is cleared.

During the retrieval of guide information, advice necessary to facilitate the retrieval of guide information is given to the user. The user operates the imaging device 300 on this advice. When the retrieval becomes successful as a result of the retrieval of guide information, the retrieved guide information is displayed on the display unit 306. When the retrieval is unsuccessful, a non-retrievable button 306e shown in FIG. 13C is indicated.

In this way, the retrieval of guide information according to the present embodiment is conducted independently of the photography operation and others. Thus, the load of the retrieval of guide information on the imaging device 300 can be reduced. When the guide information retrieval button 306b is not selected but the photography button 306a is selected, the photography operation is performed without the retrieval of guide information. In this case as well, the load on the imaging device 300 is reduced. No information unnecessary for the user is displayed during photography, and the user does not feel annoyed.

Figure 14:
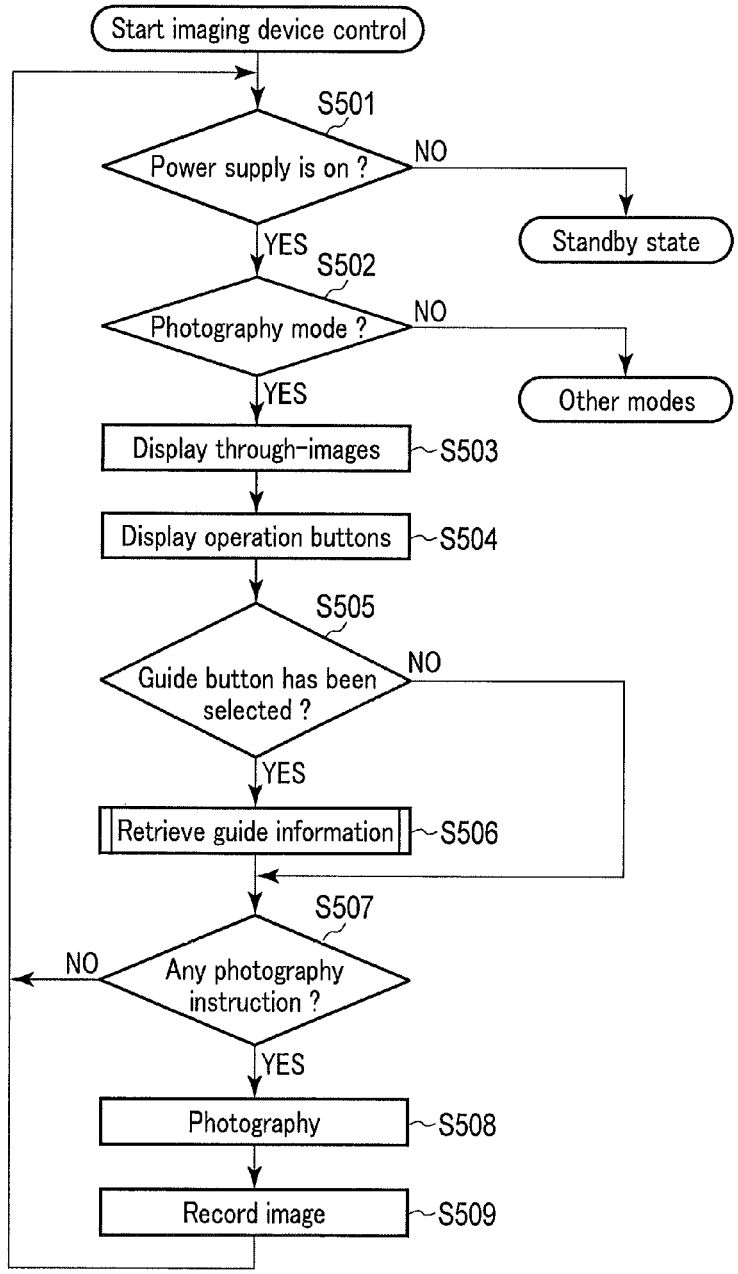
FIG. 14 is a flowchart showing the control of the imaging device.

Details of the operation of the imaging device according to the present embodiment are described below. FIG. 14 is a flowchart showing the control of the imaging device 300. The processing in FIG. 14 is performed in accordance with a program prestored in the control unit 302.

In FIG. 14, the control unit 302 judges whether the power supply switch has been turned on (step S501). When judging in step S501 that the power supply switch has not been turned on, the control unit 302 shifts the imaging device 300 to a standby state. In the standby state, minimum necessary functions in the imaging device 300 such as the judgment in step S501 are only performed.

When judging in step S501 that the power supply switch has been turned on, the control unit 302 judges whether the operation mode of the imaging device 300 is a photography mode (step S502). The photography mode is an operation mode to take images for recording. The operation mode of the imaging device 300 is determined, for example, in accordance with the operation of the operation unit 312 or the touch panel 314 by the user. When judging in step S502 that the operation mode of the imaging device 300 is not the photography mode, the control unit 302 performs processing corresponding to an operation mode other than the photography mode. The operation mode other than the photography mode is, for example, a reproduction mode. The reproduction mode is not described in detail.

When judging in step S502 that the operation mode of the imaging device 300 is the photography mode, the control unit 302 performs through-image display (step S503). The through-image display is an operation to display images obtained by successive operation of the imaging unit 304 on the display unit 306 in real time. The through-image display may be performed in the eyepiece display unit 308. After the through-image display, the control unit 302 displays operation buttons over through-images (step S504). The operation buttons include the photography button 306a and the guide information retrieval button 306b.

After the display of the operation buttons, the control unit 302 judges whether the guide information retrieval button 306b has been selected by the user (step S505). When judging in step S505 that the guide information retrieval button 306b has not been selected, the control unit 302 shifts the processing to step S507. When judging in step S505 that the guide information retrieval button 306b has been selected, the control unit 302 starts the processing of guide information retrieval (step S506). Details of the guide information retrieval will be described later.

When judging in step S505 that the guide information retrieval button 306b has not been selected or after the retrieval of the guide information, the control unit 302 judges whether the whether there is any photography operation by the user (step S507). The photography operation is, for example, an operation to press the release button by the user, a touch release operation using the touch panel 314, or an operation to select the photography button 306a. When judging in step S507 that there is no photography operation by the user, the control unit 302 returns the processing to step S501.

When judging in step S507 that there is a photography operation by the user, the control unit 302 performs the photography operation (step S508). The photography operation is an operation to control the imaging unit 304 to acquire image data for recording. After the execution of the photography operation, the control unit 302 performs, by the image processing unit 3024, image processing for the image data obtained by the photography operation. The control unit 302 then records the image data after the image processing in the recording unit 310 (step S509). The control unit 302 then returns the processing to step S501.

Figure 15:
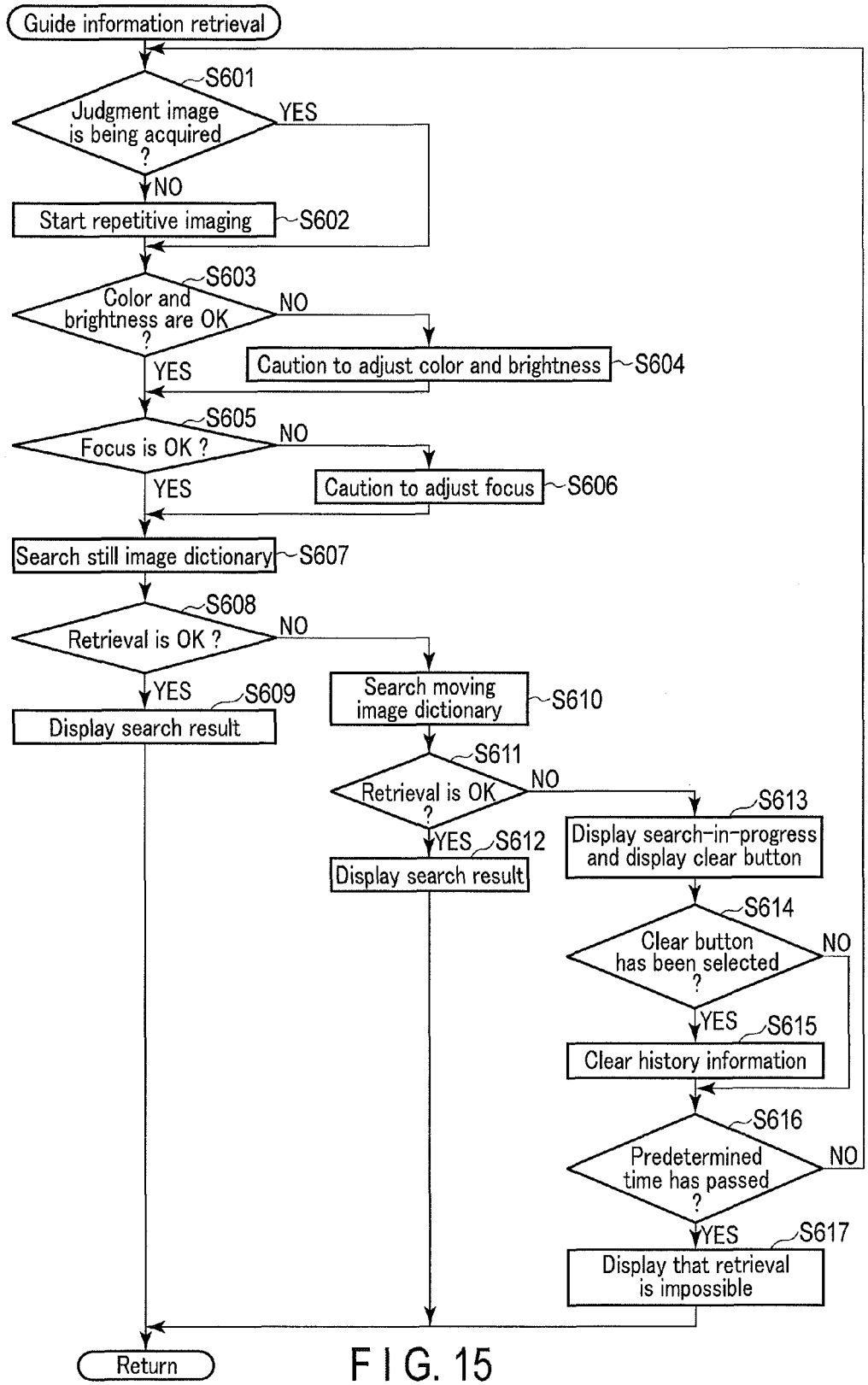
FIG. 15 is a flowchart showing processing of guide information retrieval.

FIG. 15 is a flowchart showing processing of guide information retrieval. In FIG. 15, the control unit 302 judges whether an image (judgment image) necessary to retrieve guide information is being acquired (step S601). When judging in step S601 that the acquisition of the judgment image has been already started, the control unit 302 shifts the processing to step S603. When judging in step S601 that the acquisition of the judgment image has not been started, the control unit 302 starts repetitive imaging by the imaging unit 304 (step S602). Image data obtained by the repetitive imaging is loaded into the control unit 302 as a judgment image.

When judging in step S601 that the acquisition of the judgment image has been already started or after step S602, the control unit 302 judges whether the color and brightness of the judgment image meet conditions suited to the retrieval of guide information (step S603). The condition of the color is, for example, that the color of the judgment image can be judged. The condition of the brightness is, for example, that the brightness of the judgment image is beyond a predetermined value at which the shape of the target in the judgment image can be detected. When judging in step S603 that the color and brightness of the judgment image meet the conditions suited to the retrieval of guide information, the control unit 302 shifts the processing to step S605. When judging in step S603 that the color and brightness of the judgment image do not meet the conditions suited to the retrieval of guide information, the control unit 302 cautions the user to adjust the color and brightness of the judgment image (step S604). This caution is given, for example, by the display on the display unit 306. In response to the caution, the user operates the imaging device 300. For example, the user adjusts the aperture, the shutter speed, and the sensitivity of the image pickup device. As a result, the brightness of the judgment image is adjusted.

When judging in step S603 that the color and brightness of the judgment image meet the conditions suited to the retrieval of guide information or after step S604, the control unit 302 judges whether the focus state of the judgment image meets a condition suited to the retrieval of guide information (step S605). The condition of the focus state is, for example, that the target in the judgment image is in focus. When judging in step S605 that the focus state of the judgment image meets the condition suited to the retrieval of guide information, the control unit 302 shifts the processing to step S607. When judging in step S605 that the focus state of the judgment image does not meet the condition suited to the retrieval of guide information, the control unit 302 cautions the user to adjust the focus state of the judgment image (step S606). This caution is given, for example, by the display on the display unit 306. In response to the caution, the user operates the imaging device 300. For example, the user uses manual focus to bring a certain target into focus.

When judging in step S605 that the focus state of the judgment image meets the condition suited to the retrieval of guide information or after step S606, the control unit 302 retrieves guide information by comparing information on the image of the current frame obtained for the through-image display with the still image dictionary stored in the guide information DB 3104 (step S607). For example, on the basis of the characteristic information regarding the still image such as the shape and color of the target, the distance from the imaging device 300 to the target, the current time, and the current position, guide information corresponding to such characteristic information is retrieved from the guide information DB 3104. The guide information may be retrieved by the portable terminal 400. The guide information may also be retrieved by use of the server 500.

After step S607, the control unit 302 judges whether the retrieval using the still image dictionary has been successful (step S608). When judging in step S608 that the retrieval using the still image dictionary has been successful, the control unit 302 displays the retrieved guide information on the display unit 306 (step S609). The control unit 302 then ends the processing in FIG. 15. When more than one piece of guide information have been retrieved, a desired one of the pieces of guide information may be selected by the user.

When judging in step S608 that the retrieval using the still image dictionary has not been successful, the control unit 302 retrieves guide information by comparing information on the images up to previous frames obtained for the through-image display with the moving image dictionary (This indicates the relation between image changes and words, and may be paraphrased as a database that associates the temporal change of the characteristic information regarding the target image with words.) stored in the guide information DB 3104 (step S610). For example, on the basis of the characteristic information regarding the moving images such as the history of the changes of the shape and color of the target, the history of the change of the distance from the imaging device 300 to the target, the history of the temporal change, and the history of the change of the current position, guide information corresponding to such characteristic information is retrieved from the guide information DB 3104. The "characteristics of the image which involve temporal changes" converted into character information in the moving image dictionary may be paraphrased as the temporal change of the characteristic information for the target image. Character information and words that are retrieved accordingly may be adjectives or adverbs. A moving image dictionary to be assumed may associate the temporal change of the position of the target image and the frequency with imitative words such as "flutter" or "brr". Naturally, the character information may be changed depending on whether the whole target or a part of the target is swinging or whether the image is swinging vertically or horizontally. The guide information may be retrieved by the portable terminal 400. The guide information may also be retrieved by use of the server 500.

After step S610, the control unit 302 judges whether the retrieval using the moving image dictionary has been successful (step S611). When judging in step S611 that the retrieval using the moving image dictionary has been successful, the control unit 302 displays the retrieved guide information on the display unit 306 (step S612). The control unit 302 then ends the processing in FIG. 15. When more than one piece of guide information have been retrieved, a desired one of the pieces of guide information may be selected by the user.

When judging in step S611 that the retrieval using the moving image dictionary has not been successful, the control unit 302 displays the search-in-progress icon 306c and the clear button 306d shown in FIG. 13C (step S613). The control unit 302 then judges whether the clear button 306d has been selected (step S614). When judging in step S614 that the clear button 306d has not been selected, the control unit 302 shifts the processing to step S616. When judging in step S614 that the clear button 306d has been selected, the control unit 302 clears the history information (step S615). The processing in FIG. 15 may be ended when the clear button 306d has been selected.

When judging in step S614 that the clear button 306d has not been selected or after step S615, the control unit 302 judges whether a predetermined time (e.g. one minute) has passed (step S616). When judging in step S616 that the predetermined time has not passed, the control unit 302 returns the processing to step S601. When judging in step S616 that the predetermined time has passed, the control unit 302 indicates the non-retrievable button 306e shown in FIG. 13C (step S617). The control unit 302 then ends the processing in FIG. 15.

As described above, according to the present embodiment, the guide information retrieval mode exclusive to the retrieval of guide information is provided to allocate most of the processing in the imaging device 300 to the retrieval of guide information, so that the load of the retrieval of guide information on the imaging device 300 can be reduced. In the guide information retrieval mode, the retrieval of guide information is only performed, so that guide information is retrieved under conditions (the color, brightness, and focus) suited to the retrieval of guide information. If the guide information is unnecessary, the user can directly perform the photography operation. Thus, the user can concentrate on the photography operation.

The imaging device 300 according to the present embodiment may be used in cooperation with the portable terminal 400 shown in FIG. 6A to FIG. 6C. In this case, through-images are displayed on the display unit 406 of the portable terminal 400. Therefore, the aforementioned operation buttons are also displayed on the display unit 406 of the portable terminal 400. The user selects the photography button 306a or the guide information retrieval button 306b by the touch panel 408. When the photography button 306a is selected, the portable terminal 400 instructs the imaging device 300 to perform the imaging operation. In contrast, when the guide information retrieval button 306b is selected, the processing to retrieve guide information shown in FIG.

15 is performed by the imaging device 300 and the portable terminal 400. For example, the caution display in FIG. 15 is performed in the display unit 406 of the portable terminal 400. In the meantime, the repetitive imaging for the retrieval of guide information is performed by the imaging device 300.

In such a modification as well, it is possible to obtain advantageous effects similar to those in the previously described embodiment. The imaging device 300 allows a higher degree of freedom in the designs of the image pickup device and the imaging lens than the portable terminal 400. It is therefore possible to provide an imaging unit having a higher function than in the portable terminal 400. When provided with the imaging unit having a higher function, the imaging device 300 can take images of higher quality than the portable terminal 400. By sending such high-quality images to the portable terminal 400, it is possible to display high-quality through-images on the display unit 406 of the portable terminal 400, or record high-quality images in the recording unit 404. Moreover, if guide information is retrieved by the high-quality images, precision of the retrieval of guide information can be improved. Further, guide information can also be retrieved by the portable terminal 400.

The techniques according to the embodiments are also applicable to, for example, the fields of industrial equipment and medical equipment other than consumer usage as an image display apparatus, an inspection apparatus, and a caution apparatus.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image processing apparatus comprising:
   an image processor comprising:
   an image acquisition unit which acquires an image;
   an image recognition unit which recognizes image characteristic information acquired by the image acquisition unit;
   a character information acquisition unit which acquires character information from the image characteristic information recognized by the image recognition unit, wherein the character information acquisition unit includes a moving image dictionary which associates motion characteristics with the character information; and
   a communication unit which communicates the character information acquired by the character information acquisition unit to a guide information retrieval device that retrieves guide information from the character information.

2. The image processing apparatus according to claim 1, wherein the character information acquisition unit acquires the character information from a temporal change of the image characteristic information.

3. An image processing apparatus comprising:
   an image processor comprising:
   an image acquisition unit which acquires an image;
   an image recognition unit which recognizes characteristic information that permits character information to be acquired from an image acquired by the image acquisition unit, wherein the image recognition unit includes a moving image dictionary which associates motion characteristics with the character information; and
   a communication unit which communicates the characteristic information recognized by the image recognition unit to the guide information retrieval device that acquires character information from the characteristic information to retrieve guide information.

4. The image processing apparatus according to claim 1, wherein the information that permits the character information to be acquired includes the shape and color of a target in the image, and information regarding the distance to the target.

5. The image processing apparatus according to claim 4, further comprising a model information recording unit which records model information regarding the imaging device that has taken the image,
   wherein the communication unit further communicates the model information to the guide information retrieval device.

6. The image processing apparatus according to claim 3, wherein the image recognition unit acquires the character information from a temporal change of the characteristic information.

7. The image processing apparatus according to claim 5, further comprising:
   a position detection unit which detects a position where the image has been acquired; and
   a clock unit which detects a time when the image has been acquired,
   wherein the image recognition unit further recognizes the position and the time as the image characteristic information.

8. A communication system comprising:
   an image processor comprising:
   an image acquisition unit which acquires an image,
   an image recognition unit which recognizes characteristic information that permits character information to be acquired from the image acquired by the image acquisition unit,
   a character information acquisition unit which acquires character information from the characteristic information recognized by the image recognition unit, and
   an image processing apparatus side communication unit which sends the character information acquired by the character information acquisition unit; and
   a guide information retrieval processor comprising:
   a guide information retrieval device side communication unit which receives the character information communicated from the image processing apparatus side communication unit, wherein the guide information is retrieved after the color, brightness, and focus state of the image obtained by the image acquisition unit are set to conditions suited to the retrieval of the guide information,
   a retrieval unit which retrieves guide information from the received character information, and
   a presentation unit which presents the retrieved guide information to a user.

9. A communication system comprising:
   an image processor comprising:
   an image acquisition unit which acquires an image, an image recognition unit which recognizes characteristic information that permits character information to be acquired from the image acquired by the image acquisition unit, and an image processing apparatus side communication unit which sends the characteristic information acquired by the image recognition unit; and a guide information retrieval processor comprising:

a guide information retrieval device side communication unit which receives the character information communicated from the image processing apparatus side communication unit, wherein the guide information is retrieved after the color, brightness, and focus state of the image obtained by the image acquisition unit are set to conditions suited to the retrieval of the guide information, a character information acquisition unit which acquires character information from the received characteristic information, a retrieval unit which retrieves guide information from the acquired character information, and a presentation unit which presents the retrieved guide information to a user.

10. A communication method comprising:

acquiring an image;

recognizing characteristic information that permits character information to be acquired from the acquired image;

acquiring character information from the recognized characteristic information;

communicating the acquired character information to a guide information retrieval device that retrieves guide information from the character information, wherein the guide information is retrieved after the color, brightness, and focus state of the acquired image are set to conditions suited to the retrieval of the guide information;

retrieving guide information from the communicated character information in the guide information retrieval device; and presenting the guide information retrieved in the guide information retrieval device to a user.

11. A communication method comprising:

acquiring an image;

recognizing characteristic information that permits character information to be acquired from the acquired image;

communicating the recognized characteristic information to a guide information retrieval device that acquires character information from the characteristic information to retrieve guide information, wherein the guide information is retrieved after the color, brightness, and focus state of the acquired image are set to conditions suited to the retrieval of the guide information;

acquiring character information from the communicated character information;

retrieving guide information from the acquired character information in the guide information retrieval device; and presenting the guide information retrieved in the guide information retrieval device to a user.

12. An imaging device comprising:

an imager which images a target to acquire an image of the target;

a switch which switches between a photography mode to use the image acquired by the imaging unit for recording and a guide information retrieval mode to use the image acquired by the imaging unit for the retrieval of guide information, wherein the guide information is retrieved after the color, brightness, and focus state of the image obtained by the imaging unit are set to conditions suited to the retrieval of the guide information;

a recorder which records the image acquired by the imaging unit in the photography mode; and a processor comprising:

an image recognition unit which recognizes characteristic information from the image acquired by the imaging unit in the guide information retrieval mode; and a retrieval unit which retrieves the guide information from the recognized characteristic information.

13. The imaging device according to claim 12, wherein the switch unit switches between the photography mode and the guide information retrieval mode by a user operation.

14. The imaging device according to claim 13, wherein the user operation is an operation on a touch panel.

* * * * *